US009639557B2

(12) United States Patent
Arslan et al.

(10) Patent No.: US 9,639,557 B2
(45) Date of Patent: May 2, 2017

(54) POSITIONING SYSTEM

(71) Applicant: SENSEWHERE LIMITED, Edinburgh (GB)

(72) Inventors: Tughrul Sati Arslan, Edinburgh (GB); Zankar Upendrakumar Sevak, Edinburgh (GB); Firas Alsehly, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 249 days.

(21) Appl. No.: 14/373,097

(22) PCT Filed: Jan. 18, 2013

(86) PCT No.: PCT/GB2013/050117
§ 371 (c)(1),
(2) Date: Jul. 18, 2014

(87) PCT Pub. No.: WO2013/108043
PCT Pub. Date: Jul. 25, 2013

(65) Prior Publication Data
US 2014/0365488 A1  Dec. 11, 2014

Related U.S. Application Data

(60) Provisional application No. 61/588,903, filed on Jan. 20, 2012.

(30) Foreign Application Priority Data

Jan. 18, 2012  (GB) .................................. 1200831.4

(51) Int. Cl.
G06F 17/30  (2006.01)
G01S 5/02  (2010.01)
H04W 64/00  (2009.01)

(52) U.S. Cl.
CPC ...... *G06F 17/30241* (2013.01); *G01S 5/0242* (2013.01); *G06F 17/30581* (2013.01); *H04W 64/00* (2013.01)

(58) Field of Classification Search
CPC .... G06F 17/30; G06F 17/00; G06F 17/30241; G06F 17/30607
(Continued)

(56) References Cited

U.S. PATENT DOCUMENTS 8,200,251 B2  6/2012  Huang
8,700,060 B2  4/2014  Huang
(Continued)

FOREIGN PATENT DOCUMENTS

EP  1 884 184  2/2008
EP  2 360 959  8/2011
(Continued)

*Primary Examiner* — Isaac M Woo
(74) *Attorney, Agent, or Firm* — Nixon & Vanderhye PC

(57) ABSTRACT

There is disclosed a method of managing a database of positioning data, the positioning data including electromagnetic signal source data for use by a positioning system, and the method comprising: receiving signal data relating to signals received from a plurality of electromagnetic signal sources; associating an appropriate one of a plurality of zone identifiers with each of the electromagnetic signal sources, each zone identifier being associated with a respective geographical zone; selecting a subset of the plurality of electromagnetic signal sources in dependence on their associated zone identifiers; processing the signal data relating to the subset of the plurality of electromagnetic signal sources to compute position estimates of the electromagnetic signal sources; and updating the database of electromagnetic signal source data in dependence on the computed position estimates.

27 Claims, 18 Drawing Sheets

(58) Field of Classification Search
USPC .................................................. 707/600–899
See application file for complete search history.

(56) References Cited

U.S. PATENT DOCUMENTS

| | | |
|---|---|---|
| 2003/0004640 A1* | 1/2003 | Vayanos .................. G01S 5/14 |
| | | 701/469 |
| 2003/0125046 A1 | 7/2003 | Riley et al. |
| 2008/0176583 A1 | 7/2008 | Brachet et al. |
| 2009/0303120 A1 | 12/2009 | Alizadeh-Shabdiz |
| 2010/0324813 A1 | 12/2010 | Sundararajan et al. |
| 2011/0026506 A1 | 2/2011 | MacNaughtan et al. |
| 2011/0165845 A1 | 7/2011 | Pan et al. |
| 2011/0205125 A1 | 8/2011 | Lin et al. |
| 2012/0133555 A1 | 5/2012 | Hyun |
| 2012/0157123 A1 | 6/2012 | Li et al. |

FOREIGN PATENT DOCUMENTS

| | | |
|---|---|---|
| GB | 2 323 988 | 10/1998 |
| WO | 2007/025159 | 3/2007 |
| WO | 2010/075369 | 7/2010 |
| WO | 2011/047310 | 4/2011 |
| WO | 2011/077166 | 6/2011 |
| WO | 2011/127659 | 10/2011 |
| WO | 2012/082828 | 6/2012 |

\* cited by examiner

POSITIONING SYSTEM

This application is the U.S. national phase of International Application No. PCT/GB2013/050117 filed 18 Jan. 2013 which designated the U.S. and claims priority to UK Patent Application No. 1200831.4 filed 18 Jan. 2012 and claims the benefit of U.S. Provisional Application No. 61/588,903 filed 20 Jan. 2012, the entire contents of each of which are hereby incorporated by reference.

FIELD OF THE INVENTION

The present invention relates to a method of and system for identifying the position of a user using emissions from a plurality of electromagnetic signal sources, and to a method of managing a database concerning electromagnetic signal sources for use as part of such a method and system.

BACKGROUND TO THE INVENTION

One example of an electromagnetic signal source is a wireless access point, such as a Wi-Fi base station (Wireless Access Point), which is used to communicate wirelessly with a device by the transmission and reception of electromagnetic radiation in the form of radio waves. Other electromagnetic signal sources may for example include optical (infra-red) communication devices and electromagnetic/wireless beacons of various sorts, including connectable and non-connectable beacons according to the Bluetooth short range wireless connectivity standard specification (Bluetooth beacons).

It is known to use electromagnetic signal sources, such as WAPs and Bluetooth Beacons, to estimate the position of a device (typically a mobile device). It is known to maintain a master database concerning the position of WAPs and other electromagnetic signal sources across a wide geographical area (e.g. a country, a land mass, the world etc.) and to use this master database to provide a positioning system to determine the position of (typically mobile) devices. Such master databases typically also specify an identifier of each WAP (e.g. MAC address) and typically also a measurement of transmitted signal strength. Thus, for example, a smartphone with Wi-Fi capability can determine the identity and signal strength of adjacent WAPs and Bluetooth beacons, and a triangulation can be carried out based on the known locations of the electromagnetic signal sources in question in order to determine the location of the smartphone (and hence user).

It is also known to update said master databases using data obtained from mobile devices, for example, mobile devices carried by users of the positioning system. The updates may include identifying new WAPs and other electromagnetic signal sources, making measurements helpful to improving estimates of the position of WAPs and other electromagnetic sources, and identifying changes in electromagnetic sources, for example that an electromagnetic signal source has moved or disappeared.

Such procedures can be useful for improving data which has already been obtained in a systematic survey, or detecting errors arising from movement or disappearance of an electromagnetic signal sources. However, they cannot be readily used to extend data into regions where existing master databases have significant gaps (referred to herein as void zones). It is generally required for an initial survey to be carried out before positioning will function successfully in a new zone, particularly an indoor zone, such as a shopping centre, where satellite positioning systems are generally unavailable. This means that users of existing systems may find themselves unable to use a given positioning system despite the presence of temporarily or permanently stationary electromagnetic sources which could be detected by their mobile device.

In some systems, relatively detailed data may be transmitted from a mobile device to the server or servers responsible for providing access to the master databases mentioned above. There is an incentive to provide more detailed data to allow more advanced processing and location estimation to be carried out by the server, especially if readings from multiple users are being combined. Indeed, there is a further incentive to widen user participation to improve the accuracy of estimates, but the pressure to include data from more users and to provide more detailed information results in a vast amount of data being sent to the location server. To make the processing of such data more efficient—and in some cases possible at all—existing systems typically process the received data in batches on a periodic basis, for example every day or every week. In this way, the master database is slowly updated with new information.

US2008/0176583 describes methods and systems for selecting and providing a relevant subset of Wi-Fi location information indicative of estimated positions of Wi-Fi Access Points to a mobile client device so that the client device may estimate its position with efficient utilization of resources. US2008/0176583 also teaches that data received from client devices can be used to update information stored with respect to Wi-Fi Access Points. However, no teaching is provided of how to cope with the vast amount of data which may be gathered from a plurality of user devices in such a situation.

US2011/0026506 describes systems and methods for collecting information at a server pertaining to the configuration of one or more wireless networks. Also disclosed in US2011/0026506 are methods for collecting information responsive to the coverage or quality of the wireless network configuration information already stored in a network database. However, the method of US2011/0026506 involves discarding collected information which is not being actively sought by the server before it is provided to the server which leads to the loss of potentially useful information.

WO2011/077166 provides a teaching of a method of estimating the location of a plurality of electromagnetic signal sources comprising: scanning at a first plurality of locations to generate signal source position data, the signal source position data representing estimates of the position of at least one of said signal sources; scanning at a second plurality of locations using a signal detection system to generate signal detection data, the signal detection data relating to signals received at the second plurality of locations from the signal sources; processing the signal source position data in dependence on the signal detection data to correct estimation errors in the signal source position data; and outputting the processed signal source position data. However, WO2011/077166 involves processing the signal source position data in a batch. This means that there is typically a lengthy delay between the detection of an electromagnetic signal source which was previously unknown and the availability of its position for use in estimation of the position of a user device.

GB2323988 describes a method of refining the estimate of the position of a satellite for use in a satellite positioning system. However, data from a plurality of user devices is processed in a batch before the refined estimate of the position of a satellite can be used in the estimation of a position of a mobile device, leading to a significant delay before the refined estimate of the position of the satellite can be used in estimating the position of a mobile device. In addition, a further positioning system is needed to provide an initial estimate of the position of the satellite.

The present invention seeks to address these and other problems in the prior art.

SUMMARY OF THE INVENTION

In a first aspect of the invention, there is provided a method of managing a database of positioning data, the positioning data including electromagnetic signal source data for use by a positioning system, and the method comprising:
  receiving signal data relating to signals received by user devices from a plurality of electromagnetic signal sources;
  associating each of the electromagnetic signal sources with an appropriate geographical region selected from of a plurality of geographical regions;
  selecting a subset of the plurality of electromagnetic signal sources in dependence on their associated geographical regions;
  processing the signal data relating to the subset of the plurality of electromagnetic signal sources to compute position estimates of the electromagnetic signal sources; and
  updating the database of electromagnetic signal source data in dependence on the computed position estimates.

It will be understood that, typically (and preferably), the steps of the method of the first aspect of the invention are performed in order (i.e. in the order in which they appear above).

Typically, the steps of the method of the first aspect of the invention are performed by a server. Most preferably at least the following steps are performed by the server:
  receiving signal data relating to signals received by user devices from a plurality of electromagnetic signal sources;
  selecting a subset of the plurality of electromagnetic signal sources in dependence on their associated geographical regions;
  processing the signal data relating to the subset of the plurality of electromagnetic signal sources to compute position estimates of the electromagnetic signal sources; and
  updating the database of electromagnetic signal source data in dependence on the computed position estimates.

By associating signal sources with geographical regions, and then selectively processing signal data relating to certain of those regions, the processing of the signal data can be prioritised in a relatively computationally efficient manner, allowing more important signal source data associated with specific geographical regions to be processed in a timely fashion, substantially regardless of increasing volumes of signal data being received from users. Preferably, the database of electromagnetic signal source data is also updated in dependence on computed position estimates concerning some or all of the plurality of electromagnetic signal sources which are not selected, but less quickly (i.e. so that there is on average a greater delay) or less comprehensively (e.g. so that some of the signal data for the unselected signal sources is not used to update the database).

The term 'geographical region' is used in a broad sense to describe an essentially arbitrary delineation of physical space, though the geographical regions as used herein are typically defined in terms of a particular subset of electromagnetic signal sources that they contain. For this reason, and given that there may be significant estimation errors in the position of the signal sources (due to signal propagation effects, limited measurement accuracy and the like), the geographical regions may be essentially virtual, since in reality they may overlap or otherwise be entwined. The geographical regions described herein typically relate to areas with a particular floor of a building, but should not be considered as being limited as such (nor, in particular, to merely 2D arrangements). Geographical regions may for example simply be unique codes associated with electromagnetic signal sources whose purpose is typically merely to distinguish, rather than describe, different geographical regions. Thus, electromagnetic signal sources might be associated with geographical regions by way of recording a code denoting a geographical region with data concerning the electromagnetic signal source, or by recording a code denoting an electromagnetic signal source with data concerning a geographical region, or by defining a geographical region (e.g. by defining the 2 or 3 dimensional coordinates of vertices of polygons or polyhedra defining the geographical region) and searching through a database for electromagnetic signal sources having coordinated within that geographical region.

The geographical regions (and most typically the geographical regions associated with the electromagnetic signal sources of the subset) may comprise one or more indoor regions (e.g. a building, one or more floors of a building, one or more fractions of one or more floors of a building, a tunnel such as a railway tunnel and so on).

Typically, the subset of electromagnetic signal sources and/or the geographical regions associated therewith are dynamically updated. More specifically, following the step of updating the database of electromagnetic signal source data in dependence on the computed position estimates, one or more geographical regions and/or the subset of electromagnetic signal sources may be redefined. For example, one or more geographical regions and/or the subset of electromagnetic signal sources may be redefined responsive to a determination that sufficiently accurate data is now available in a particular geographical region and/or sufficiently accurate data is now available with respect to one or more (or all) of the electromagnetic signal sources of the subset so that alternative geographical regions and/or alternative subsets can be prioritised. Accordingly, the method may comprise, after the step of updating the database of electromagnetic signal source data in dependence on the computed position estimates, determining a quantity and/or quality of the updated electromagnetic signal source data associated with the electromagnetic signal sources of the subset. The method may further comprise redefining one or more geographical regions and/or the subset responsive to a determination that a quality and/or quantity of the updated electromagnetic signal source data associated with the electromagnetic signal sources of the subset meets one or more quality and/or quantity criteria. The method may further comprise repeating the method according to the first aspect of the invention with respect to the redefined geographical region(s) and/or the redefined subset.

The term 'signal' in this context is not intended to be limited to transmissions encoding information but is considered to apply essentially to any electromagnetic emission.

The positioning system is typically configured to estimate the position of a device using measurements of the strength of emissions received from one or more electromagnetic signal sources, for example using triangulation and other techniques known to one skilled in the art. The device may for example include a satellite positioning module configured to estimate the position of the device using a satellite positioning system (such as GPS, Galileo, GLONASS, Beidou, Compass etc.) and the positioning system may use the position estimated by the satellite positioning module when determining an initial estimate of the position of the device.

The step of selecting a subset of electromagnetic signal sources in dependence on their associated geographical regions may comprise selecting a subset of one or more electromagnetic signal sources responsive to a determination that the said one or more electromagnetic regions are associated with geographical regions where satellite positioning is unavailable to the device (i.e. where no communication is available with, or no sufficiently accurate information is receivable from, satellites of the satellite positioning system at the device). This allows data associated with geographical regions in which satellite positioning is unavailable to the device to be prioritised over regions where satellite positioning is available in the processing of received data.

By positioning data we refer to the positioning data available to determine the position of the device. The positioning data typically comprises some or all of the position, an identifier (e.g. MAC address), and signal strength data concerning each of a plurality of electromagnetic signal sources. By position data we refer to that subset of positioning data which concerns the actual position of an electromagnetic signal source (in any suitable units, e.g. latitude, longitude, and optionally altitude or x, y and optionally z coordinates etc.).

The method may comprise estimating the position of the device (and optionally outputting the estimated position of the device to a user, for example using the device) using the electromagnetic signal source data prior to the step of updating the database of electromagnetic signal source data in dependence on the computed position estimates. The method may further comprise estimating (or further estimating) the position of the device using electromagnetic signal source data from the updated database after the step of updating the database (and optionally outputting the further estimated position of the device to a user, for example using the device).

The method may comprise estimating the position of the device using the electromagnetic signal source data prior to the step of updating the database of electromagnetic signal source data in dependence on the computed position estimates whilst processing the signal data relating to the subset of the plurality of electromagnetic signal sources to compute position estimates of one or more of the electromagnetic signal sources used to estimate the position of the device. The method may further comprise further estimating the position of the device using electromagnetic signal source data from the updated database after the step of updating the database.

It will be appreciated that the database and the underlying hardware carrying out the various steps of the method may be implemented in any suitable fashion, for example wholly in a server or in a user device, any appropriate combination of the two, or spread across a distributed computing system. Typically the method finds particular use in the context of a user device having at least one positioning system that relies on the electromagnetic signal source data, and a location server that stores a master database of the signal source data, with the processing steps being carried out normally at the location server but in some variants partly or wholly within the user device. The signal data may for example include raw readings from a transceiver (including signal strength, MAC addresses, and so on), stand-alone position estimates and other higher level information, or any other appropriate selection of information relating to received signals. In practice, a trade off may be sought between large volumes of data (if the data is raw) and more limited usefulness (if information about signal sources has been lost due to earlier processing steps).

It may be that selecting a subset of signal sources comprises selecting signal sources associated with geographical regions that have a relatively poor coverage in the database.

The concept of 'relatively poor coverage' is intended to be construed broadly, for example meaning that the relevant portion of the database includes a relatively large number of signal sources (e.g. a proportion of signal sources exceeding a threshold) that have a relatively poor accuracy of position estimation (e.g. an uncertainty in their position exceeding a threshold), or if it appears that there are a relatively large number of signal sources in that zone which are missing from the database.

The electromagnetic signal source data relating to the selected subset of signal sources may be updated before the electromagnetic signal source data relating to the non-selected signal sources.

Accordingly the different geographical regions are prioritised, and the relevant data is processed in an order that does not match the order in which the data was received.

The method may further comprise processing the selected subset of signal sources substantially in real-time and/or on demand.

By real-time we may, for example, mean within a period of time sufficient to provide a useful enhancement to the positioning data for, say, a user walking with a user device into a void zone. In practice, this means that the data may be updated within the period of time which it takes a user to move no more than about 10 m at walking speed (6 km/hour), which is to say that the positioning data is usually (e.g. at least 90% of the time, at least 95% of the time or at least 98% of the time) updated in less than 6 seconds, preferably less than 3 seconds, and preferably less than 1 second. This does not take into account possible delays in communication where appropriate. The positioning data may be updated and a further estimate of the position of the device may be generated within 10 seconds of detecting at least one emission from a respective at least one electromagnetic signal source, preferably within 5 seconds of detecting at least one emission from a respective at least one electromagnetic signal source, more preferably within 2 seconds of detecting at least one emission from a respective at least one electromagnetic signal source and most preferably within 1 second of detecting at least one emission from a respective at least one electromagnetic signal source. The positioning data may therefore be continuously updated and actively maintained in use (or "updated dynamically") so as to make available the most current (up to date) information possible for estimating the position of the device.

In some embodiments, whilst the device is in continuous communication with an electromagnetic signal source of the subset of electromagnetic signal sources, the method comprises: estimating the position of the device using an estimate of the position of the said electromagnetic signal source from the database prior to the step of updating the database of electromagnetic signal source data; obtaining an updated estimate of the position of the said electromagnetic signal source; and estimating an updated position of the device using the updated estimate of the position of the said electromagnetic signal source.

The step of obtaining an updated estimate of the position of the electromagnetic signal source may be performed prior to updating the database (e.g. the method may comprise estimating the updated position of the electromagnetic signal source locally at the device). However, more typically the updated position of the electromagnetic signal source is obtained from the database after the step of updating the database of electromagnetic signal source data.

The step of estimating the updated estimate of the position of the device may additionally or alternatively be performed prior to updating the database (e.g. the method may comprise estimating the updated estimate of the position of the device locally at the device). Alternatively, this step may be performed after updating the database (e.g. this step may be performed at a server).

Preferably the method further comprises outputting the position and the updated position to a user (e.g. on the device) whilst the device is in continuous communication with the said electromagnetic signal source.

It will be understood that, by continuous communication, we may mean that the device remains within range of the said electromagnetic signal source (i.e. that the device is continuously capable of receiving signals from the electromagnetic signal source). It is not necessary that signals are constantly being sent between the electromagnetic signal source and the device. Typically, signals are sent between the electromagnetic signal source and the device at least every few (e.g. 10, 5 or 2) seconds.

The time period between detecting at least one emission from a respective at least one electromagnetic signal source and updating the database and generating the further estimate of the position of the device may vary on a case by case basis. For example, the time period may depend on how fast the device is moving. In some embodiments, the time period may be dependent on the time taken for the device to move from the initial position to a position within a (e.g. predetermined fixed or dynamically adjustable) radius of the estimated initial position. The radius may be fixed or adjustable on a case by case basis.

Typically the initial position is generated using the known positions of, and signals received from, one or more initial electromagnetic signal sources. Typically the positioning data is updated and used to generate a further estimate of the position of the device while the device can still detect (i.e. is still within range of) one or more (preferably the majority) of the initial electromagnetic signal sources used to generate the initial position. The positions of electromagnetic signal sources not previously included in the positioning data can thus be estimated and used to generate (and typically output to a user) the further estimate of the position of the device seamlessly without the user of the device being aware of the presence of a "void zone" where the positions of electromagnetic signal sources were previously unknown.

The method may further comprise processing the non-selected signal sources on a periodic basis, as a batch job and/or when a processing load falls below a threshold amount.

The less urgent (non-selected) signal source data may for example be processed when the CPU(s) fall below an (aggregate) load of, say, 95%, 90%, 80%, 70%, 50%, or 30%, and so on. The non-selected data may for example be processed by a background process on a server or device, in contrast to the selected data which may be processed by a foreground process. Due to differences in processing methods, it is entirely possible that the non-selected data will be processed as fast as, if not faster than, the selected data, though this would not typically be the case.

The method may further comprise assigning a priority (for example a number indicating relative importance) to each of the signal sources, and processing the signal sources substantially in order of said priority.

Updating the database may comprise at least one: of updating a database entry and adding a database entry. That is to say, it may be one or the other, or both.

The method may for example include re-estimating an existing position estimate, for example based on a larger or more accurate sample of signal data than was previously available.

Each electromagnetic signal source may have a zone code assigned to it, a first zone code being associated with a subset of signal sources having substantially the highest level of accuracy of position estimation, a second zone code being associated with zones of signal sources whose position estimates depend on position estimates associated with a zone of the first zone code. Regions of signal sources having the same zone code may or may not correspond to the said geographical regions.

There may be a third zone code associated with zones of signal sources whose position estimates depend on position estimates associated with a zone of the second zone code, and optionally further zone codes, the $n^{th}$ zone code associated with zones of signal sources whose position estimates depend on position estimated associated with a zone of the $(n-1)^{th}$ zone code. The zones codes may, for example, be zone numbers, which may be consecutive.

The relationship between zones need not be so rigorously defined, and can essentially be represented merely by different zone codes, without the geographical extent of any zone being explicitly calculated or stored. However, the concept of zone codes can facilitate processing. It will be appreciated from the above that the zone code (e.g. zone two) depends on position estimates from electromagnetic signal sources having the first zone code (e.g. zone number one), and so the estimates will be reasonably accurate but not normally as accurate as the estimates of the position of electromagnetic signal sources having the first zone code. Position estimates of electromagnetic signal sources allocated the third zone code will normally have a larger margin of error and can in some cases be very misleading, and electromagnetic signal sources having subsequent zone codes will be even less accurate, depending on many separate and interrelated estimations, each of which can introduce significant error. Typically the signal sources in zone number one (i.e. having the first zone code) can be 'mapped' with reference to secondary and highly accurate positioning systems such as GPS, and zone where electromagnetic signal sources are allocated the first zone code are typically defined on such a basis, though zones having the first zone code may also include areas having calibrated signal sources (without necessarily access to secondary, more accurate positioning systems, for example including signal sources whose location can be manually read off building plans, and the like). It will also be appreciated that first zone code, second zone code etc. is a statement of the category of zone, and not the same as zone identifiers, which could for example be any of "1, 2, 3, 4, 5, . . . ", "A, B, C, D, E, F, . . . ", "Red, Yellow, Green, . . . " and so on (essentially any arbitrary labels that allow zones to be identified). Where zone codes are consecutive numbers, it may be appreciated that adjacent zones will (or rather, should) differ by one zone number. Zones with different zone codes typically differ in terms of latitude and longitude, however they may (alternatively or also) differ in terms of altitude. For example, it may be that at least some adjacent zones of electromagnetic signal sources associated with different zone codes differ in terms of altitude. Thus zones of electromagnetic sources associated with different zone codes may be vertically spaced in some cases.

In some embodiments, the subset of electromagnetic signal sources is selected in dependence on the zone codes associated with one or more electromagnetic signal sources associated with particular geographical regions. In particular the subset of electromagnetic signal sources may be selected in dependence on a determination that zone codes associated with the signal sources of a particular geographical region indicate a poor level of coverage in the database of a particular geographical region. For example, if a particular geographical region contains a large number of electromagnetic signal sources associated with a second or third zone code, this may be indicative of poor coverage of that particular geographical region in the database and electromagnetic signal sources in that geographical region may accordingly be selected in the subset.

This feature can also be provided independently. According to a second aspect of the invention there is provided a method of managing a database of positioning data, the positioning data including electromagnetic signal source data for use by a positioning system, and the method comprising:
  receiving signal data relating to signals received from a plurality of electromagnetic signal sources;
  associating an appropriate one of a plurality of zone codes with each of the electromagnetic signal sources, each zone code being associated with a respective geographical zone, and wherein the zone codes comprise a first zone code associated with a subset of signal sources having substantially the highest level of accuracy of position estimation, and a second zone code associated with zones of signal sources whose position estimates depend on position estimates associated with electromagnetic signal source associated with the first zone code;
  processing the signal data to compute position estimates of the electromagnetic signal sources; and
  updating the database of electromagnetic signal source data in dependence on the computed position estimates.

Preferably the steps of the method of the second aspect of the invention are performed in order (i.e. the order in which they appear above).

Preferably, the steps of the method of the second aspect of the invention are performed by a server.

It will be appreciated that zones may, in conjunction with above-mentioned features or otherwise, also correspond to defined geographical features, such as rooms (for horizontal division of zones) or storeys (for vertical division of zones). The first zone may for example correspond to a ground floor and a $10^{th}$ floor, where positions have been calibrated or GPS systems can function, respectively. Adjacent floors to these may be second zones, the next floors may be third zones, and so on. In this regard it should be noted that the calibration of signal sources positions and/or entire zones may be carried out not only by the aforementioned method but by using any appropriate combination of (or one of) GPS, Bluetooth-based positioning, one or more other sensors, manual position estimate or recordal, and so on. A wide range of sensors might be employed, for example, altitude can be determined using a barometer.

It may be that processing the signal data further comprises identifying connections between zones, and processing relevant portions of the electromagnetic signal source data to re-estimate the position of relevant signal sources and optionally to recalculate zone codes of relevant zones. The connections are typically between zones in which the accuracy of the estimates of the position of electromagnetic signal sources meet one or more accuracy criteria (e.g. exceeds an accuracy threshold, or share an accuracy code). Typically the connections are between zones of electromagnetic signal sources having the same zone code (usually the first zone code). Connections may for example be groups of electromagnetic signal sources detected along a path extending between the zones.

This feature is otherwise known as 'bridging', and typically is used in a more limited context, that is identifying only zones that have been discovered to link zones of the first type (that is, zones with highly accurate estimation of the position of signal sources), though it will be appreciated that a more general approach is possible. For example, a user walking away from a zone of the first type ("Z1") may record readings that result in newly discovered signal sources being assigned to progressively higher number zones (for example "Z2", "Z3", "Z4", and so on) as signal sources from lower number zones move out of signal range and thus become unavailable for the purpose of position estimation. If the user reaches another zone of the first type ("Z1"), then the new higher order zones will be reassessed (the Z4 zone will for example become a Z2 zone, as it is now deemed to be next to a Z1 zone, and so on). This 'bridging' feature has the advantage of improving the accuracy of position estimate of signal sources, and of doing so without requiring any further 'war-walking' or the like.

Re-estimating the position of relevant signal sources may include processing portions of said signal data relating to signals received from said relevant signal sources at a plurality of different locations.

The signal data may for example include readings from a single user device at different times as it moves through a zone.

Said signal data, relating to signals received at a plurality of different locations, may be a combination of a plurality of signal data transmissions received from a respective plurality of devices.

Thus the signal data may additionally or alternatively include readings from different devices at substantially the same time with the same effect. Clearly if the readings are more instantaneous, the data will be updated more quickly also.

The method may further comprise modelling the plurality of different locations as points on a path in the vicinity of said relevant zones.

A zone code may be part of a larger data structure.

Various assumptions may be made, for example, and typically it may be assumed that the user of a device recording the signal data has walked at a substantially uniform speed on a substantially linear path. Accordingly one of the simplest solutions is to fit the position estimates of the device to a straight line passing through the zone(s). A further simplification that can be made is to assume that signal sources in the 'void' are located on the line. This can deviate significantly from reality, but it can provide a relatively robust, structured approach that facilitates future re-estimation and optimisation.

The method may further comprise:
  receiving local signal data relating to signals received at a user device from a plurality of electromagnetic signal sources local to the user device;
  processing the local signal data in dependence on the electromagnetic signal source data to generate an estimate of the position of the user device; and outputting the estimate of the position of the user device (e.g. to a user).

This aspect uses the above-mentioned database to estimate the position of a user device. The position estimate of the user device may be used to facilitate or improve the position estimate of signal sources in the vicinity of the device. The term 'local signal' is intended to clarify essentially that the signals in question can be received by the user device, and that the signal sources are not located in an entirely different and/or unrelated area.

The said database may be a local database that is at least a partial copy of a master database.

The local database may for example be a temporary cache of data from the master database, or may be a more persistent database, for example if various steps of the position estimation are carried out locally (or at least as a backup).

The method may further comprise synchronizing the local database and the master database.

The position estimate of the user device may be outputted before the local database is synchronized with the master database.

In view of these features it will be appreciated that the sequence of events relating to the estimation of position of a signal source, the estimation of position of a user device, the updating of any relevant database, and any relevant synchronisation can be delayed, omitted, or re-ordered as appropriate. This can be the case if, for example, communication is temporarily lost between a user device and location server or if, for example, positioning data is transferred peer-to-peer between two or more user devices.

The method according to the second aspect of the invention may comprise estimating the position of the device (and optionally outputting the estimated position of the device to a user, for example using the device) using the electromagnetic signal source data prior to the step of updating the database of electromagnetic signal source data in dependence on the computed position estimates. The method may further comprise estimating (or further estimating) the position of the device using electromagnetic signal source data from the updated database after the step of updating the database (and optionally outputting the further estimated position of the device to a user, for example using the device).

The method according to the second aspect of the invention may comprise estimating the position of the device using the electromagnetic signal source data available prior to the step of updating the database of electromagnetic signal source data in dependence on the computed position estimates whilst processing the signal data to compute position estimates of one or more of the electromagnetic signal sources used to estimate the position of the device. The method may further comprise further estimating the position of the device using electromagnetic signal source data from the updated database after the step of updating the database.

In some embodiments, whilst the device is in continuous communication with an electromagnetic signal source of the plurality of electromagnetic signal sources, the method comprises: estimating the position of the device using an estimate of the position of the said electromagnetic signal source from the database prior to the step of updating the database of electromagnetic signal source data; obtaining an updated estimate of the position of the said electromagnetic signal source; and estimating an updated position of the device using the updated estimate of the position of the said electromagnetic signal source.

The step of obtaining an updated estimate of the position of the electromagnetic signal source may be performed prior to updating the database (e.g. the method may comprise estimating the updated position of the electromagnetic signal source locally at the device). However, more typically the updated position of the electromagnetic signal source is obtained from the database after the step of updating the database of electromagnetic signal source data.

The step of estimating the updated estimate of the position of the device may additionally or alternatively be performed prior to updating the database (e.g. the method may comprise estimating the updated estimate of the position of the device locally at the device). Alternatively, this step may be performed after updating the database (e.g. this step may be performed at a server).

Preferably the method further comprises outputting the position and the updated position to a user (e.g. on the device) whilst the device is in continuous communication with the said electromagnetic signal source.

It will be understood that, by continuous communication, we may mean that the device remains within range of the said electromagnetic signal source (i.e. that the device is continuously capable of receiving signals from the electromagnetic signal source). It is not necessary that signals are constantly being sent between the electromagnetic signal source and the device. Typically, signals are sent between the electromagnetic signal source and the device at least every few (e.g. 10, 5 or 2) seconds.

In a further, related, third aspect of the invention, there is provided a method of improving the estimation of the position of a device, the device being operable to use a positioning system that generates position estimates in dependence on positioning data relating to emissions from electromagnetic signal sources, and the method comprising:
  using the positioning system to generate an initial estimate of the position of the device;
  detecting at least one emission from a respective at least one electromagnetic signal source;
  estimating the position of said at least one electromagnetic signal source in dependence on said initial estimate of the position of the device;
  updating the positioning data in dependence on the estimated position of said at least one electromagnetic signal source;
  using the positioning system to generate a further estimate of the position of the device; and
  outputting the further estimate of the position of the device (e.g. to a user).

In this aspect, the position of at least one electromagnetic signal source is estimated and the positioning data is updated accordingly. The updated positioning data is then used to generate a further estimate of the position of the device.

Preferably the steps of the method of the third aspect of the invention are performed in order (i.e. the order in which they appear above).

The steps of the method of the third aspect of the invention may be performed by the device. At least the step of detecting at least one emission from a respective at least one electromagnetic signal source is typically performed by the device. The following steps of the method of the third aspect of the invention may be performed by a server:
  using the positioning system to generate an initial estimate of the position of the device;
  estimating the position of said at least one electromagnetic signal source in dependence on said initial estimate of the position of the device;

updating the positioning data in dependence on the estimated position of said at least one electromagnetic signal source;

using the positioning system to generate a further estimate of the position of the device; and outputting the further estimate of the position of the device (e.g. to a user).

Preferably, the positioning data is updated and used to generate a further estimate of the position of the device in real time. For example, the positioning data may be updated within a period of time sufficient to provide a useful enhancement to the positioning data for, say, a user walking with a user device into a void zone. In practice, this means that the data may be updated within the period of time which it takes a user to move no more than about 10 m at walking speed (6 km/hour), which is to say that the positioning data is usually (e.g. at least 90% of the time, at least 95% of the time or at least 98% of the time) updated in less than 6 seconds, preferably less than 3 seconds, and preferably less than 1 second. This does not take into account possible delays in communication where appropriate. The positioning data may be updated and a further estimate of the position of the device may be generated within 10 seconds of detecting at least one emission from a respective at least one electromagnetic signal source, preferably within 5 seconds of detecting at least one emission from a respective at least one electromagnetic signal source, more preferably within 2 seconds of detecting at least one emission from a respective at least one electromagnetic signal source and most preferably within 1 second of detecting at least one emission from a respective at least one electromagnetic signal source. The positioning data may therefore be continuously updated and actively maintained in use (or "updated dynamically") so as to make available the most current (up to date) information possible for estimating the position of the device.

The time period between detecting at least one emission from a respective at least one electromagnetic signal source and updating the positioning data and generating the further estimate of the position of the device may vary on a case by case basis. For example, the time period may depend on how fast the device is moving. In some embodiments, the time period may be dependent on the time taken for the device to move from the initial position to a position within a (e.g. predetermined fixed or dynamically adjustable) radius of the estimated initial position. The radius may be fixed or adjustable on a case by case basis.

Typically the initial position is generated using the known positions of, and signals received from, one or more initial electromagnetic signal sources. Typically the positioning data is updated and used to generate a further estimate of the position of the device while the device can still detect (i.e. is still within range of) one or more (preferably the majority) of the initial electromagnetic signal sources used to generate the initial position. The positions of electromagnetic signal sources not previously included in the positioning data can thus be estimated and used to generate (and typically output to a user) the further estimate of the position of the device seamlessly without the user of the device being aware of the presence of a "void zone" where the positions of electromagnetic signal sources were previously unknown.

The method according to the third aspect of the invention may comprise generating the initial estimate of the device whilst updating the positioning data in dependence on the computed estimate(s) of position of the at least one electromagnetic signal source.

In some embodiments, the steps of using the positioning system to generate the initial estimate of the position of the device and using the positioning system to generate a further estimate of the position of the device are performed whilst the device is in continuous communication with the at least one electromagnetic signal source.

Preferably the method further comprises outputting the initial estimate of the position of the device and the further estimate of the position of the device to a user (e.g. on the device) whilst the device is in continuous communication with the said electromagnetic signal source.

It will be understood that, by continuous communication, we may mean that the device remains within range of the said at least one electromagnetic signal source (i.e. that the device is continuously capable of receiving signals from the electromagnetic signal source). It is not necessary that signals are constantly being sent between the electromagnetic signal source and the device. Typically, signals are sent between the electromagnetic signal source and the device at least every few (e.g. 10, 5 or 2) seconds.

Accordingly, this can enable the positioning system to more easily extend coverage into regions which contain electromagnetic signal sources not previously included in the positioning data and to thereby more easily reduce the expanse of void zones. It will be understood that both the update of the positioning data and the generating of a further estimate of the position of the device are typically performed in real time.

The step of outputting the further estimate of the position of the device (e.g. to a user) may also be performed in real time. For example, the further estimate of the position of the device may be output within 10 seconds of detecting at least one emission from a respective at least one electromagnetic signal source, preferably within 5 seconds of detecting at least one emission from a respective at least one electromagnetic signal source, more preferably within 2 seconds of detecting at least one emission from a respective at least one electromagnetic signal source and most preferably within 1 second of detecting at least one emission from a respective at least one electromagnetic signal source. The further estimate of the position of the device may be output while the device can still detect (i.e. is still within range of) one or more (preferably the majority) of the initial electromagnetic signal sources used to generate the initial position.

The step of outputting the further estimate of the position of the device may comprise outputting (e.g. displaying on the device) the further estimate of the position of the device to a user. Typically the further estimate of the position of the device is output to the user in real time.

Typically, the step of estimating the position of said at least one electromagnetic signal sources also takes the detected emissions into account. It may be that at least some of the said electromagnetic signal sources in respect of which the position is estimated and the positioning data is updated are electromagnetic signal sources in respect of which the positioning data does not initially contain any position data concerning the position of the respective signal sources, or does not initially contain any data at all. Thus, the positioning data can be updated to include position data concerning the position of electromagnetic signal sources for which no position data was initially included, or for which no data at all was included.

The positioning data may comprise data received from a master database of the position of electromagnetic sources. The positioning data may comprise temporary data stored for the purpose of estimating the position of one or more devices including the said device. Said temporary data may initially be obtained by reading data from a said master database and storing the resulting data. Some or all of the temporary data may be locally stored on the user device. Some or all of the temporary data may be stored in a server.

In a similar vein to previously, the positioning data may comprise or consist of temporary data, at least part of which is initially obtained from a master database, in which case the positioning data which is updated before the positioning system generated a further estimate of the position of the device is said temporary data.

The master database may also be updated in dependence on the said estimated position of at least one signal source. However, the master database, or at least estimates of the position of electromagnetic sources specified by the master database, may be updated more slowly than the temporary data, or in more limited circumstances, for example, only once the position of the at least one electromagnetic source has been estimated to within a threshold level of accuracy. Therefore, it may be that, as a result of the method of the invention, the position data may periodically comprise positioning data which is not present in the master database, or which concerns electromagnetic sources in respect of which there is no data in the master database, or which does not meet a quality criterion (for example, that it has been sufficiently verified, or that estimates of the position or transmitted signal strength of one or more electromagnetic signal sources are sufficiently accurate) to be included in the master database.

The steps of detecting said at least one emission, estimating the position of said at least one electromagnetic signal source, processing the positioning data and using the positioning system to generate the further estimate may be carried out while the device is at substantially the same location. Alternatively, the step of using the positioning system to generate the initial estimate may be carried out at a different location.

The initial estimate may be a previously obtained estimate of the position of the device. The initial estimate may be obtained using the positioning system. The initial estimate may be obtained using another positioning system, for example a satellite positioning system, or manually entered by a user of the device. Typically, the remaining steps of the method are only carried out in predetermined circumstances. For example, the additional steps may not be required if no new electromagnetic signal sources are discovered, or if no electromagnetic signal sources are discovered which meet predetermined criteria (for example, no electromagnetic signal sources are discovered for which uncertainty in their position exceeds a threshold, meaning that there is no requirement for additional measurements of their position).

Similarly to before, processing the positioning data may comprise adding new data relating to said at least one electromagnetic signal source. The new data may for example include characteristics of the at least one electromagnetic signal source, for example, an indicator of signal strength, an identifier of the respective electromagnetic signal source, an estimate of the location of the electromagnetic signal source.

Alternatively or additionally, processing the positioning data may comprise modifying existing data relating to said at least one electromagnetic signal source. For example, processing the position data may comprise changing a weighting ascribed to measurements of emissions from an electromagnetic source. In this aspect, the method may further comprise transmitting at least part of the positioning data to a positioning data server. The positioning system may be at least partially remote from the device. The initial estimate of the position of the device may be generated remotely from the device. The step of transmitting may be carried out after the step of generating a further estimate of the position of the device.

The method may further comprise repeating at least once the step of detecting said at least one emission in at least one further location, and using additional information gained therefrom to refine the estimate of the position of said at least one electromagnetic signal source.

The method may further comprise estimating the position of at least one further electromagnetic signal source in dependence on said further estimate of the position of the device.

The positioning data may comprise data concerning the position of a plurality of electromagnetic sources and data concerning the signal strength of the plurality of electromagnetic sources, wherein the positioning data initially defines at least one void zone within which there are not at least two of the said electromagnetic sources detectable by the user device, and wherein after the step of updating the positioning data, at least one said void zone is reduced in volume.

As noted earlier, the said positioning data may be updated in real-time (or substantially so).

The updated positioning data may be made available for estimating the position of another device in real-time. Thus, the updated positioning data may be used to estimate the position of a plurality of devices, typically in real-time.

In further aspects of the invention there are provided a user device, a server and a system, appropriate configured to carry out any method as aforesaid.

It will be appreciated that, merely by way of background, there may be contemplated a related method of estimating the location of a plurality of electromagnetic signal sources (such as wireless access points), comprising: scanning (for example with a hand-held or other scanner such as a mobile phone or laptop) at a first plurality of locations to generate signal source position data, the signal source position data representing estimates of the position of one or more said signal sources; scanning at a second plurality of locations (which is different to the first plurality of locations) using a signal detection system (such as a Wi-Fi transceiver) to generate signal detection data, the signal detection data relating to signals received at the second plurality of locations from the signal sources (and including, for example, data regarding received signal strengths and WAP base station identifiers); processing the signal source position data in dependence on the signal detection data to correct estimation errors in the signal source position data; and outputting (for example for storage in a database) the processed signal source position data. In one embodiment the signal source position data represents estimates of the position of each (every) signal source. This signal source position data may include for example the 2D or 3D co-ordinates of wireless access points (WAPs) and their identifiers or other electromagnetic signal sources and their identifiers, and may include further information such as signal strengths, position accuracy estimates, and so on. The method may be carried out in any appropriate device or location, for example in a portable handset or other device that may be carrying out the scanning operation, and/or in a remote server system. In particular the processing steps can be but need not be carried out by the same processor, computer, microcontroller or other device, and individual processing steps may be subdivided and distributed across different processors as required.

As noted, this method, which will be elaborated in more detail below, is not directly relevant to the present invention, but it will be appreciated that various features of the method described here may be applied as appropriate, and with appropriate adaption, extension or deletion, to the features of the present invention as described above.

By scanning a second time at a second set of locations (for example in closer proximity to the WAP base stations in areas not accessible by war-driving) using a signal detection system such as a Wi-Fi interface, estimates of the location of the signal sources can be corrected without the need for GPS-like functionality to be provided at the second set of locations. The correction may not in every case improve the estimation of the position of a specific signal source, but the estimation of the signal sources as a whole is generally improved. There may of course be specific environments and configurations of signal sources and scanning locations that may defy this trend (for example due to scanning in signal blackspots, extreme propagation effects such as multipath effects, and the like). Preferably the signal detection data includes at least one of signal strength, MAC addresses (for networked devices, if appropriate) or other identifier associated with a signal source, signal quality, and so on. Preferably the processing of the signal source position data comprises applying to the signal detection data at least one of the algorithms of time of arrival (TOA), time difference of arrival (TDOA), angle of arrival (AOA), and received signal strength (RSS). The processing of the signal source position data preferably further comprises using the signal detection data to estimate the position of the second plurality of locations. The estimation of the position of the second plurality of locations (that is, the places where the second set of scans were carried out) can for example be presented to a person operating the scanning device to allow a visual or other check to be carried out (and the estimated scanning locations can for example be cross-referenced against other data, for example to check that the estimated location is not within a wall or other inaccessible and clearly incorrect location).

This method, presented for interest's sake, may further comprise receiving location information data representing information about the second plurality of locations, and processing the signal source position data may further comprise using the location information data to estimate the position of the second plurality of locations. For example, the location information data may comprise a user estimate of the position of at least one of said second plurality of locations. The location information data may comprise a user estimate of the position of at least one of the electromagnetic signal sources. Preferably the method further comprises inputting the location information data via a user input device, such as a handheld unit. The method may comprise receiving data from a user which enables or enhances the estimation of the second plurality of locations. The method may comprise receiving data from one or more additional sensors which measure a parameter relating to movement, direction or altitude, for example, one or more of a magnetometer, an accelerometer, a barometer. Such received data may be taken into account when estimating the position of the second plurality of locations. The location information data can improve the estimation of at least one of the second plurality of positions. In one example the user can input a correction to an approximate GPS (if available) or other positioning system reading if it appears that the reading is incorrect. The user can also (or alternatively) input additional reference data such as a height, which can for example overcome the relative inaccuracy of height readings in GPS and similar systems. The height may most easily be inputted in the form of the storey number of a building in which the user is located; the storey number can be converted into a height relatively approximately by multiplying an average/universal storey height (such as 5 meters, 10 meters or somewhere inbetween) with the storey number and adding to a height datum for the location, for example, or using more detailed information about the building in question or the location to obtain a more accurate result.

Processing the signal source position data may additionally or alternatively further comprise processing the signal detection data in accordance with an environmental model representing environmental factors applying to the signal sources. This can allow various environmental factors (such as the density of population of a building, presence or absence of various structural features, thickness of walls, reflectiveness of surfaces, and so on) to be taken into account to improve the accuracy of the estimation. In this case, the method preferably further comprises receiving at least one of environmental model selection data representing a choice of environmental model and environmental model parameter data representing a choice of at least one parameter of the environmental model, and processing the signal detection data in accordance with said at least one of the environmental model selection data and the environmental model parameter data. The method may further comprise inputting said at least one of environmental model selection data and environmental model parameter data via a user input device. Alternatively the selection data or parameter data may be inputted elsewhere, for example after the survey has been carried out, by a surveyor or system operator with appropriate knowledge, experience or training. In another embodiment the model or model parameters may be (to an appropriate degree) derived automatically (for example by sensing devices or by cross-referencing the estimated scanning location to related geographical data, for example).

Different environment models may be applied in dependence on certain measurable factors. For example a different environmental model may be applied in dependence on whether the scanning location is indoors or outdoors (such as the Stanford University Interim, SUI, Model, for example). Essentially any appropriate data used in the processing steps described herein may to an appropriate degree be inputted by a user, either at the scanning site (for example using a handheld device) or remotely (either coincident with the scanning process or at a later time/date). Furthermore the processing of the signal source position data preferably further comprises generating further signal source position data representing new estimates of the signal sources in dependence on the signal detection data. The further signal source data (for example a list of updated estimated co-ordinates of WAP base stations) can for example be plotted to allow a visual comparison of the previous and current estimates of the locations of the signal sources. As before, the new estimate data can be cross-referenced, for example to check that the new estimated locations are plausible.

Preferably this exemplary method further comprises processing the signal source position data and the further signal source position data to determine an appropriate adjustment to the signal source position data. Any appropriate process may be used to determine the appropriate adjustment, including least squares estimation methods, for example. The method may also further comprise processing the signal detection data to estimate the location of additional signal sources that were not detected at the first plurality of locations, and adding additional signal source position data to the signal source position data. Thus the second phase of scanning (at the second set of locations) may for example uncover signal sources (such as WAP base stations) that were not found in the first phase of scanning (at the first set of locations). The scanning at the first plurality of locations preferably comprises: scanning at the first plurality of locations to generate initial signal detection data, the initial signal detection data relating to signals received at the first plurality of locations from the signal sources; processing the initial signal detection data in dependence on first scanning position data, the first scanning position data representing the position of each of the first plurality of locations, in order to generate the position estimate data. Accordingly the signal sources can be used in both phases to facilitate the estimation of the position of the sources.

The scanning at the first plurality of locations may comprise using the (aforesaid) signal detection system to generate the initial signal detection data. Alternatively a different signal detection system may be used as appropriate. For example more sophisticated vehicle-mounted equipment may be used for the first phase of scanning, and less sophisticated but more mobile equipment may be used for the second phase of scanning. The method may further comprise using a positioning system (which may be an absolute positioning system, for example a global navigation satellite system such as GPS or AGPS, GLONASS, Beidou-2 or Gallileo) at each of the first plurality of locations to generate the first scanning position data. The positioning may for example include GPS/AGPS devices, cell tower-based triangulation, inertial sensors, GIS, or a hybrid system combining two or more such subsystems. Alternatively manual methods may be used, for example using data entry by an operator of the scanning equipment. Conventional printed maps may be used, for example, to establish the position of each location. Other processes for determining the location are of course possible as appropriate. A user interface may be provided to enable a user to input data to enable or to enhance performance of a positioning system such as GPS assistance data (estimated position, time, ephemerides etc) for GPS. The method may comprise receiving data from one or more additional sensors which measure a parameter relating to movement, direction or altitude, for example, one or more of a magnetometer, an accelerometer, a barometer.

The positioning system may generally be more effective at the first plurality of locations than at the second plurality of locations. The positioning system may furthermore not be operable in at least one of the second plurality of locations (or indeed may not be operable in over 25%, 50%, 75%, 80%, 90% or 95% of the second plurality of locations). For example the second plurality of locations may be partially (for example over 25%, 50%, 75%, 80%, 90% or 95%) or wholly indoors, preventing effective operation of GPS and other absolute/global positioning systems. Conversely, the signal detection system may be generally more effective at the second plurality of locations than at the first plurality of locations. The signal detection system may for example only work (or work most effectively) in relatively close proximity to the signal sources or in the absence of attenuating materials between the detection system and the signal source, for example partially (such as over 25%, 50%, 75%, 80%, 90% or 95%) or wholly indoors or unobstructed by walls. It may be that the first plurality of locations, for example constrained by requirements such as allowing the passage of a vehicle, may in general be too far from the (majority of) signal sources to allow effective detection. The method may further comprise scanning using a signal detection system at a further plurality of locations to generate further signal detection data, and further processing the signal source position data in dependence on the further signal detection data. Thus the second phase of scanning can be repeated once, twice, three or even more times in order further to refine the accuracy of the positional estimates.

In a further, exemplary, embodiment a second (or further) signal detection system can be used at the first or second (or further) plurality of scanning locations, to complement the (first) signal detecting system and further to improve the accuracy of the location estimates. The first, second and (optionally) further phases of scanning need not be carried out at substantially the same time (on the same day, or on the same week, and so on). The method may further comprise processing the signal source position data to generate map data representing a map of the signal sources. The term 'map' preferably connotes a data set including data that encodes and/or identifies at least one geographical or other location. The map may for example be a set of records where each record provides the 2D or 3D co-ordinates of a signal source and may also include further data about the signal source such as an assigned name or identifier. The map may be embodied in a computer-readable signal or medium or may, for example, be a physical representation of the signal sources in a human-readable form (overlaid, for example, on a conventional geographical plan). The map may be encoded in any appropriate format, such as the GIS file standard for example. The signal source may be a wireless access point, such as a base station in a wireless communications network. The signal source may be a Wi-Fi or Wi-Max base station, GSM or other cellular communications tower, a radio transmitter or beacon, or any other appropriate electromagnetic signal source. The signal source may facilitate unidirectional (such as a simple transmitter) or bidirectional (such as a network node) communication, for example.

At least one of the signal detection data, the signal source position data and the processed signal source position data may be transmitted via the wireless access point. This can facilitate the distribution of processing of the data between, for example, a hand-held device with limited computing power and storage, and a remote server and database. Alternatively all processing and scanning functionality may be carried out using the same device. At least part of the scanning is typically carried out using a hand-held portable device. For example the second phase of scanning (at the second plurality of locations) and optionally also the first phase of scanning (at the first plurality of locations) may be carried out using a suitably-equipped hand-held device such as a suitably configured mobile telephone, laptop or hand-held device customised for the specific application. Additionally or alternatively, at least part of the scanning may be carried out using a vehicle-mounted portable device. For example at least the first phase of scanning may be carried out using a vehicle-mounted device that could have improved power and selectivity (for example using a direction antenna) compared to a hand-held device. The method may further comprise: storing the processed signal source position data; receiving a user location request from a user device (such as a mobile telephone or other portable device), the user location request including data obtained from a signal detection system (such as a Wi-Fi receiver) associated with the user device; processing the stored signal source position data in dependence on the user location request data to generate user location data representing an estimate of the location of the user device; and outputting the user location data. Accordingly the aforementioned method can be integrated into a user location service. The user location method may use additional systems in the user device or remote server (or elsewhere, for example via the Internet) to assist in estimating the user device's location. For example in-built GPS receivers in the user device may be used.

The present, exemplary, method may comprise identifying one or more locations where a user location service cannot be provided or where the accuracy of a user location service falls below a threshold, and locating one or more further electromagnetic signal sources so as to provide or to improve the accuracy of a user location service in a said identified location. The new signal source is then scanned at a further second set of locations. In any of the methods as aforesaid, the scanning may be carried out by a user travelling between a plurality of locations (such as between the first plurality of locations, and/or between the second plurality of locations), for example on foot, via a vehicle or either. The user may interact with any type of hardware to facilitate any of the other method steps mentioned above (or below). In another exemplary embodiment there is provided a method of estimating the location of a plurality of electromagnetic signal sources, comprising: inputting signal source position data, the signal source position data representing estimates of the position of one or more said signal sources obtained by scanning at a first plurality of locations; inputting signal detection data, the signal detection data relating to signals received at a second plurality of locations from the signal sources; processing the signal source position data in dependence on the signal detection data to correct estimation errors in the signal source position data; and outputting the processed signal source position data. This method may find particular application for example in relation to computer code for a server that is operable to communicate via a network or other communications link with a user device at a scanning location. In a further exemplary embodiment there is provided a portable unit programmed with computer program code for causing the portable unit to carry out a method as aforesaid. In a yet further exemplary embodiment there is provided a server programmed with computer program code for causing the portable unit to carry out a method as aforesaid.

Although the embodiments of the invention described above with reference to the drawings comprise methods performed by computer apparatus, and also computer apparatus, the invention also extends to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc, hard disc, or flash memory, optical memory, and so on. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

Although various aspects and embodiments of the present invention have been described separately above, any of the aspects and features of the present invention can be used in conjunction with any other aspect, embodiment or feature where appropriate. For example apparatus features may where appropriate be interchanged with method features.

Optional features disclosed in relation to any one aspect of the invention may be optional features of any of the aspects of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

A method and system will be described for locating electromagnetic signal sources, with a particular (but not exclusive) application to a system for locating a user device by cross-referencing signals received at the user device with data previously gathered using the abovementioned method and system. Thus, the location of stationary electromagnetic signal sources is estimated. Errors in the estimates of the location of the stationary electromagnetic signal sources are corrected. The resulting locations of the stationary electromagnetic signal sources are later used as reference points for locating a (typically mobile) user device.

In one particular embodiment a method is described in relation to dynamically determining the location (such as position co-ordinates) of Wireless Access Points (WAPs) or Wireless Beacons in wireless technology-based positioning systems. Predominantly the wireless standard described in this document is Wi-Fi and the positioning system is a Wi-Fi-based system, but this method can equally be applied to other related standards such as Bluetooth and radio-frequency (RF) and other systems. Furthermore this method can also be applied in determining the location of base stations in other communication technologies such as mobile communication (such as GSM and CDMA for example), Wi-Max and so on.

In a Wi-Fi-based positioning system, the co-ordinates/location of WAPs are used together with other signal processing algorithms to estimate users' location in Wireless Local Area Networks (WLAN). Here, the users can be mobile or stationary within WLAN and have any device with inbuilt or external Wi-Fi capability. This device may also have a capability to connect to the Internet for exchanging parameters with central server, for example Wi-Fi system parameters such as Mac addresses, signal strength, their co-ordinates etc. One example is a user with a mobile phone using inbuilt Wi-Fi to connect to the Internet. Hence, in this positioning method, a user's location accuracy relies heavily on the accuracy of the known position of the WAPs in respective WLANs.

War-driving and war-walking, described above, are some techniques for determining and/or mapping a WAP's position.

Finally, an embodiment will be described in which a position estimate of a user device (or other device), calculated using positioning data, is improved, and the positioning data (which may be temporary and/or local to the device) may also be improved.

Figure 1:
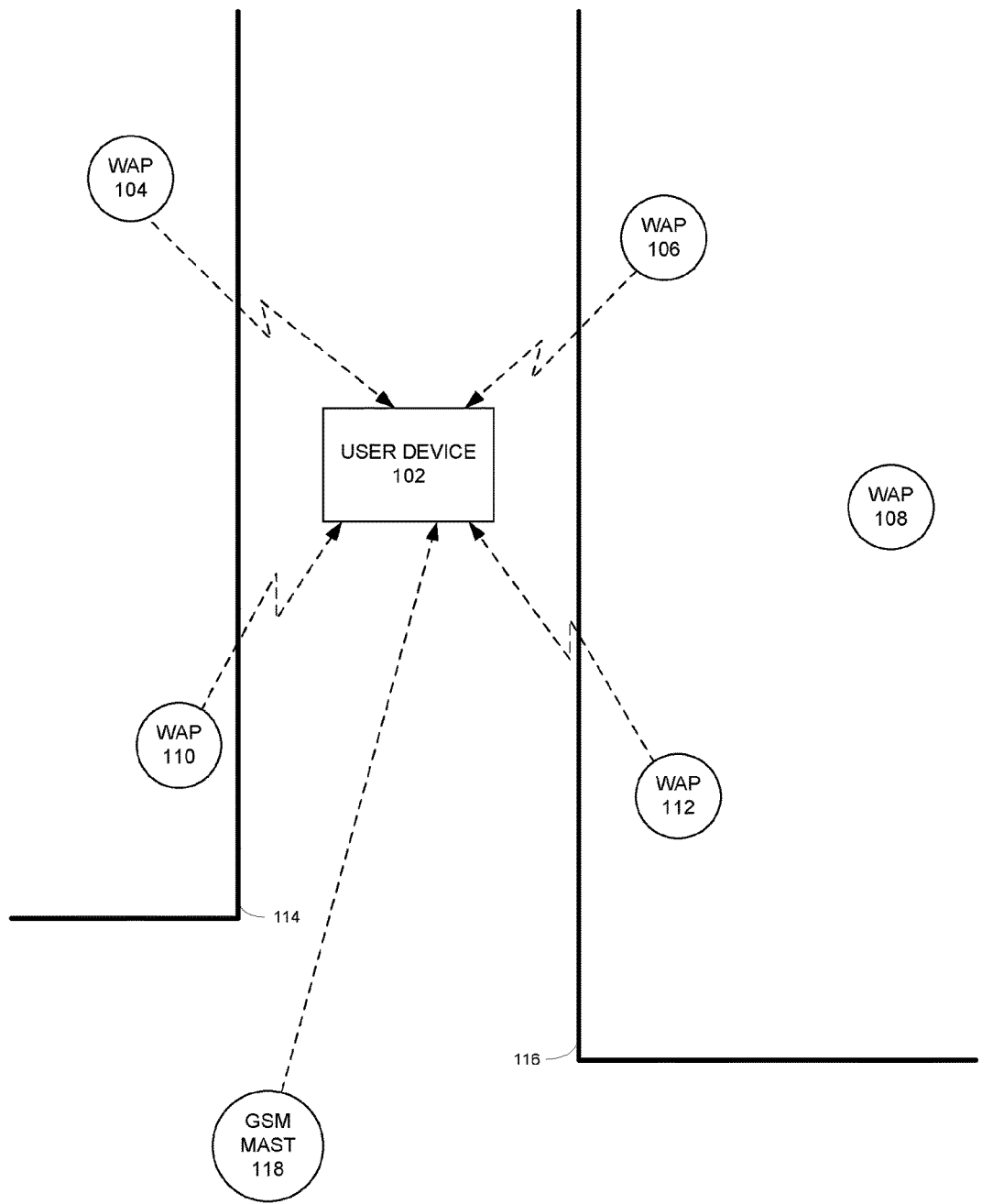
FIG. 1 is an illustration in overview of a system for locating a user device using Wi-Fi wireless access point (WAP) signal sources.

FIG. 1 is an illustration in overview of an example system for locating a user device using Wi-Fi wireless access point (WAP) signal sources. A user device 102 is operated by a user (not shown) and contains a Wi-Fi adaptor (also not shown). A number of wireless access points (WAPs) 104, 106, 108, 110, 112 are located in the immediate vicinity of the user within two buildings 114, 116. Because of signal attenuation, transmission power limits and other factors, only WAPs 104, 106, 110, 112 can be detected by the Wi-Fi adaptor in the user device 102. The WAP 108 is not detected by the user device 102. A GSM (mobile telephone) mast 118 and others may also be present, and properties of these and other electromagnetic signal sources may also be measured and used in the location finding system.

The user device 102 can measure certain characteristics of the signals, either in terms of the signal qualities such as signal strength, angle of incidence, and so on, or in terms of the data carried by the signal, such as the MAC address or other identifier associated with the transmitting WAP.

The system processes various of the signal characteristics and compares the characteristics with data in a database. As is described in more detail below, the location system can use the stored data relating to some or all of the relevant WAPs 104, 106, 110, 112 to triangulate (or otherwise determine) the position of the user device 102 and hence also the user.

A method and system will now be described in which the disadvantages of both war-driving and war-walking methods can be substantially overcome, using a multi-phase process and using dynamic and self-correcting recursive techniques to determine location co-ordinates of WAPs accurately inside buildings and in difficult environments (for example with many obstacles). To search and determine WAPs' location co-ordinates will be referred as "scanning" and "mapping" respectively here onwards.

Figure 2:
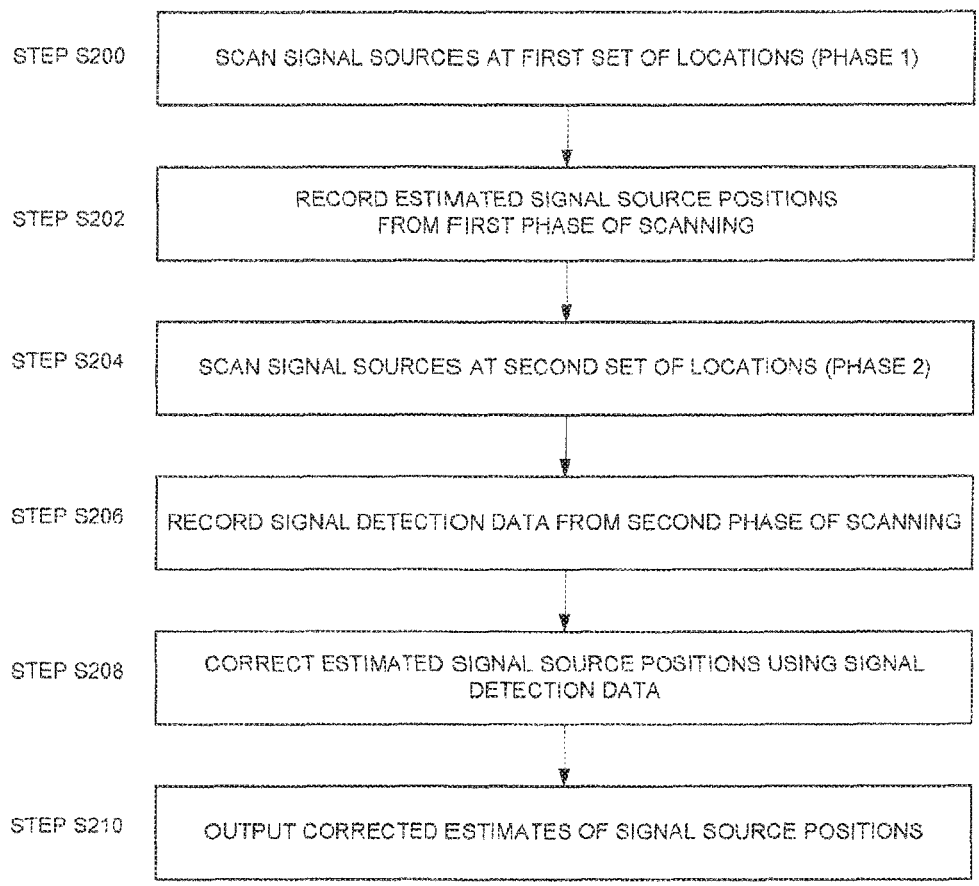
FIG. 2 is a flowchart illustrating a process for locating the position of wireless access points (WAPs) for use in the system of FIG. 1.

FIG. 2 is a flowchart illustrating a process for locating the position of wireless access points (WAPs) for use in the system of FIG. 1.

In step S200, in a first phase of the process, signal sources (signals from the WAPs) are scanned at a first set of locations. Various scanning processes can be used, for example using a hand-held device such as a mobile telephone, smartphone or other device, and either outside or inside a building (in the present embodiment). In an alternative embodiment the first set of locations is formed from the path of a vehicle carrying out a war-driving procedure. As described above and below (for example in relation to FIG. 7), the data gathered during the scanning process is used to generate estimates of the positions of the signal sources (WAPs). These estimated positions are then stored (in step S202). In the first phase of scanning the positions of the WAPs are usually (but not necessarily) estimated by combining the output of a global or absolute positioning system such as GPS or AGPS with the result of a relative positioning system such as triangulation using WAP signal strengths (again described below in more detail). In another embodiment the first set of estimated positions may for example merely be drawn from a map or plan of the building or area in which the scanning takes place and entered by user directly using device's user interface in to the processing software. The term 'scanning' may thus be interpreted quite broadly in such a case.

In step S204, in a second phase of the process, signal sources (the WAP signals) are scanned again at a second set of locations. In a preferred embodiment the second set of locations is the path of a scanning operative generally within or amongst buildings that have been scanned at a distance by the war-driving in phase 1. In other embodiments the scanning is automated and may be carried out by the same or a differently configured war-driving set-up. The scanning locations may be chosen by an operative 'on the ground' or determined in real-time or prior to the scanning operation as a result of an analysis of the results gathered in phase 1 (for example with reference to geographical and/or commercial data relating to the scanning environment and the buildings and other structures therein. The scanning results are recorded in step S206.

As is described in more detail below, the user may also record their own estimate of the position of the second set of locations or may input a correction (where appropriate) to an automatically derived (by GPS, for example) estimate of the positions, and may also input a selection of environmental model to apply and/or parameters for use with such a model (as is discussed in more detail below). A user may also input data to enable or to enhance performance of a reference positioning system such as GPS assistance data (estimated position, time, ephemerides etc) for GPS. The user may input the position of some or all of the second set of locations from a map. The ability to input the position of some or all of the second set of locations can be especially helpful in that it may correct errors which arose from errors in the estimated location of the first plurality of locations.

In step S208 the first set of estimated WAP locations (or locations of other signal source such as mobile telephone masts and so on) are processed and corrected using the results of the second phase of the scanning process. This process is described in more detail below. The corrected estimates are then output in step S210.

In the first embodiment, the user or a group of users carrying out the mapping process have compact consumer devices (such as smart mobile phones, laptops and so on) or sophisticated electronic devices (such as a customised computing device, amplifiers, antennas etc) with Wi-Fi capability, and preferably other positioning system capability such as GPS/AGPS, cell tower based positioning, and so on. These devices may have additional sensors which could assist in positioning, for example, an accelerometer, magnetometer etc. These devices may also have the capability other than Wi-Fi to connect to the Internet such as through mobile Internet service provider gateways.

Users may for example be equipped with Sensewhere proprietary software running on a consumer mobile device with or without any operating system and having a microcontroller, GPS/AGPS and Wi-Fi hardware capabilities. Essentially all of the scanning and mapping processes described herein including multiple phases of scanning can be carried out using software such as this using previously described hardware when needed. The chosen software may also be capable of using a user's input to record information about the area/places where scanning/mapping is being done, such as position co-ordinates, types of buildings, height information such as scanning floor etc., urban or rural place types and so on when needed.

Figure 3:
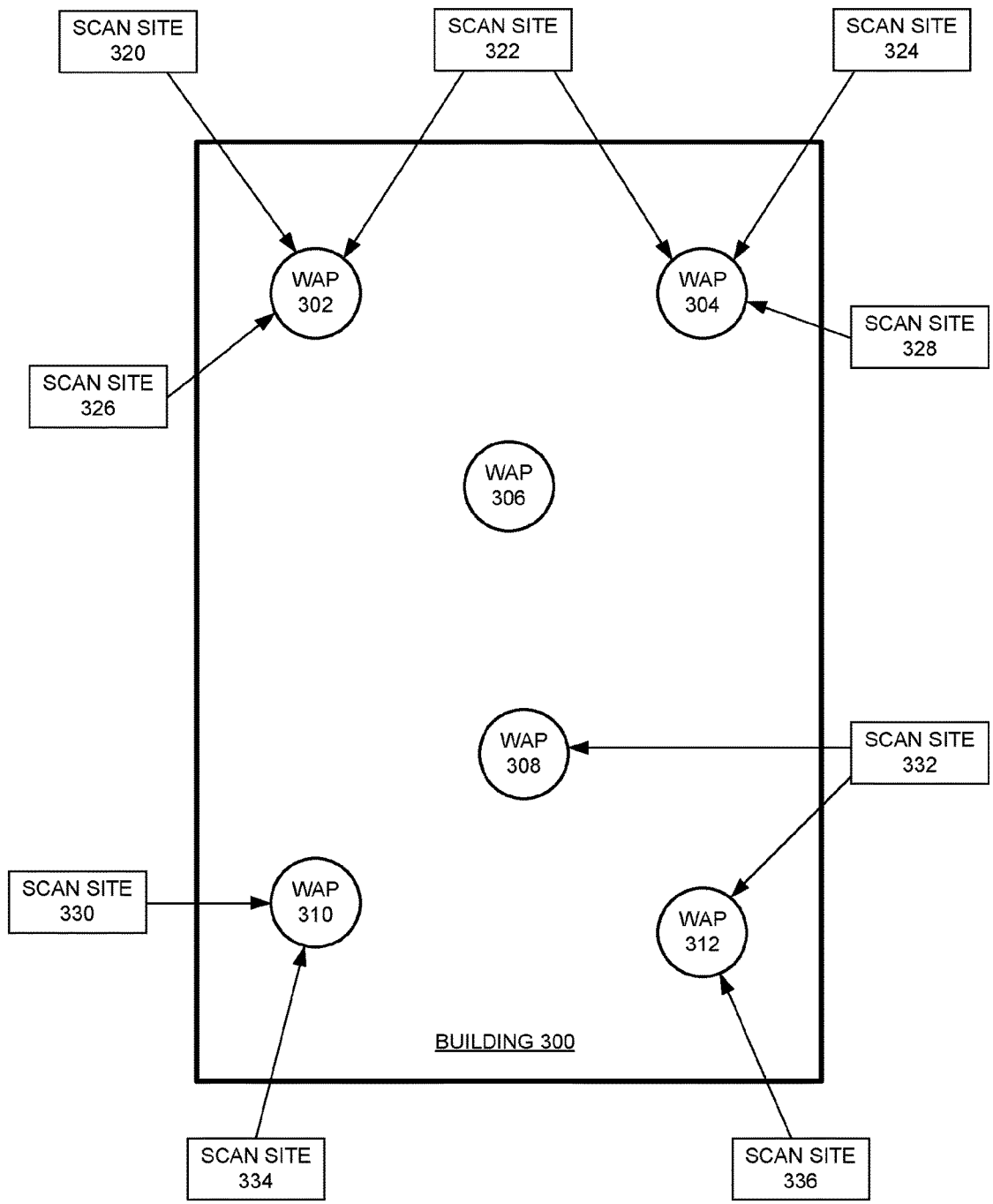
FIG. 3 is an illustration of the first phase of scanning of a set of wireless access points (WAPs) in a building in accordance with the process of FIG. 2.

FIG. 3 is an illustration of the first phase of scanning of a set of wireless access points (WAPs) in a building in accordance with the process of FIG. 2.

In FIG. 3 a building 300 contains six WAPs 302, 304, 306, 308, 310, 312. Nine scanning sites 320, 322, 324, 326, 328, 330, 332, 334, 336 are chosen around the perimeter of the building, although in practice this may be around fewer than all sides, and may for example only be along one or two sides of the building (depending on accessibility, for example). It will be appreciated that more or fewer WAPs may be found and more and less scans (and corresponding scanning locations) may be used, depending for example on the size of the building and the complexity of the environment.

The WAPs (shown in circles) are placed in a typical building at different places. In the present embodiment a user described earlier with a consumer device such as smart phone with Wi-Fi and GPS/AGPS capability can scan this building from different places from outside (shown in a rectangular box) all around the building. At every place user records Wi-Fi scanning parameters such as signal strength, MAC addresses of visible WAPs, Signal Quality etc. and user's own position through GPS/AGPS. The user may also record other useful environment specific data from observation and/or prior knowledge such as height and type of building, numbers and types of physical signal obstructions close to the scanning place etc. The user may also record data from additional sensors on or in the device, if available, to assist in positioning. For example, they may record heading data received from a magnetometer, height information from a barometer etc.

As stated earlier, any other position system or methods excluding GPS and its variants may also be used to locate user's position such as Cell Tower based triangulation, Inertial Sensors, User Position Inputs, GIS etc. or any Hybrid system combining these technologies.

As can be seen from FIG. 3, many WAPs can be scanned from more than one place from outside. For example WAPs 302, 304 are scanned from three locations, WAPs 310, 312 are scanned from two locations, and WAP 308 is scanned from one location. WAP 306 is not scanned from any location because of its central location in the building and lack of visibility of the signals from the outer scanning locations.

The records from the scanning process are processed together by software installed on the device using various signal processing algorithms to determine the distances between user location at different places and visible Wireless Access Points, and subsequently to create a map of these WAPs.

A number of distance measurements algorithms exist to allow positioning using a Wi-Fi or other comparable system. The algorithms include, for example, Time of Arrival (TOA), Time Difference of Arrival (TDOA), Angle of Arrival (AOA), Received Signal Strength (RSS), and so on. Depending on the technical capabilities of the software, mobile devices and WAPs, the RSS based distance measurement algorithm is normally employed but the other algorithms may also be used as appropriate.

In the RSS algorithm, the strength (power) of a Wi-Fi signal at the receiver (user) is measured in comparison to the transmitted strength of a signal from the radio source (WAP) and is given by following mathematical equation in free space:

$$P_r = \frac{P_t G_t G_r \lambda^2}{(4\pi)^2 d^2} \tag{1}$$

Where $P_r$ is the received power, $P_t$ is a transmitted power, $G_r$ and $G_t$ are receiver and transmitter antenna gains respectively, $\lambda$ is a signal wavelength and d is a distance between source and receiver. This equation can also be represented in terms of propagation gain (PG) as:

$$PG = \frac{P_r}{P_t G_t G_r} = \left(\frac{\lambda}{4\pi d}\right)^2 \tag{2}$$

and in decibels form as:

$$PG_{dB} = 20 \log\left(\frac{\lambda}{4\pi d}\right) \tag{3}$$

The free space model (equations) cannot easily be applied in real world environments without modifications because of the signal propagation uncertainties. Wi-Fi signal propagation can be affected by many factors such as signal attenuations and reflections (multipath effects) from the surfaces, building types, moving objects and people, transmission frequency, antenna heights and polarisation, and so on. However, various models exist to try to model different environments and signal propagation behaviour through them to determine the distance between receiver and source. For example, there are models available to predict signal behaviour for different indoor environments. One of the indoor models is described by the following equation:

$$PG_{dB} = 20\log\left(\frac{\lambda}{4\pi d_0}\right) + 10n\log(d_0) + X_\sigma \text{ for } d > d_0 \quad (4)$$

Where X, n and $d_0$ are the parameters which vary with different indoor environments and which can be determined empirically. For example, the values of X, n and $d_0$ for a typical hard partitioned office environment are 7.0, 3.0 and 100 respectively.

User input can be provided to select types of environment and then to use specific values of the abovementioned parameters stored in memory (that were for example previous input by the user or other operator). Alternatively, if user inputs are not available default values can be chosen from the software configuration.

There are also models available for outdoor environments for example. One such model, designated as Stanford University Interim (SUI) Model, is described by the following equation:

$$PL = 20\log\left(\frac{4\pi d_0}{\lambda}\right) + 10n\log\left(\frac{d}{d_0}\right) + X_f + X_h + s \text{ for } d > d_0 \quad (5)$$

PL is described as path loss and other parameters can be processed similarly as described in for indoor models, that is (for example) either through user inputs or from software configuration.

Once all the distances are determined using any of the models available, they are processed together with reference location co-ordinates of the places where user have scanned from to map visible WAPs one by one. Depending on the number of measurements (records) for a specific WAP, various methods are available to map these WAPs. One method, triangulation, is described below with reference to FIG. 8.

Figure 4:
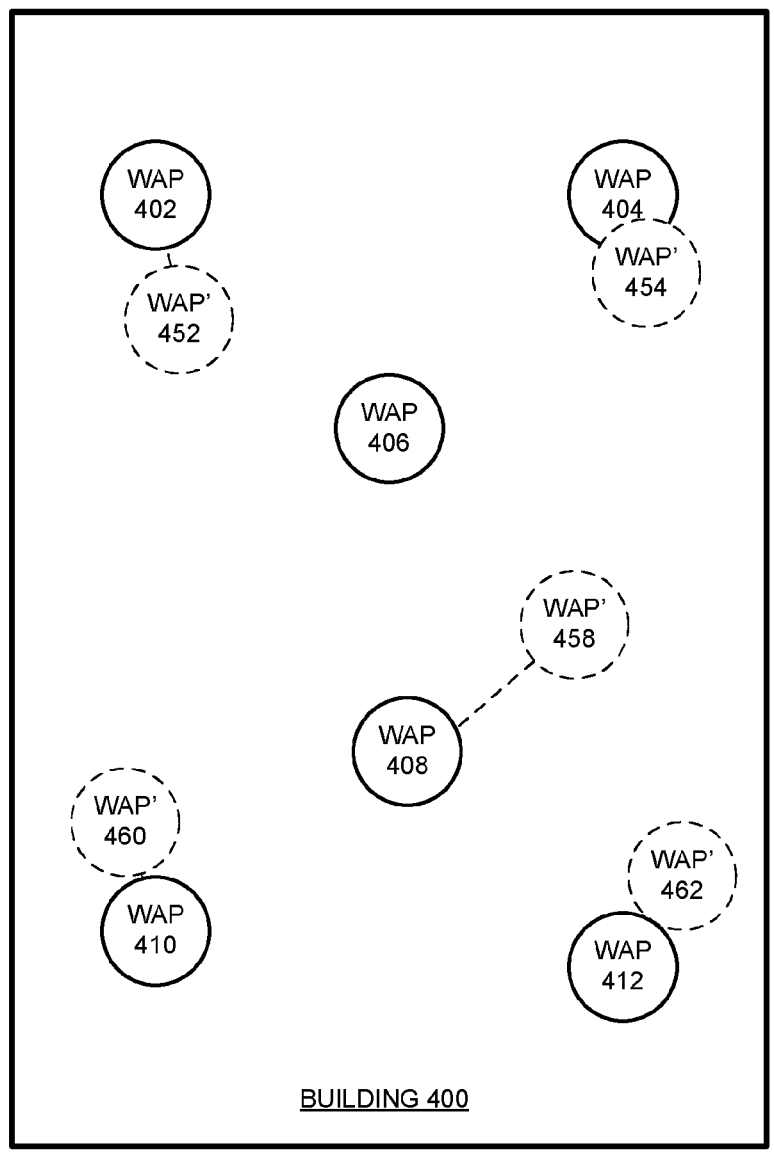
FIG. 4 is an illustration of the estimated positions of the WAPs of FIG. 3 after the first phase of scanning in the process of FIG. 2.

FIG. 4 is an illustration of the estimated positions of the WAPs of FIG. 3 after the first phase of scanning in the process of FIG. 2.

In FIG. 4 the actual locations of WAPs 402, 404, 406, 408, 410, 412 are shown with a solid circle, and the estimated locations WAP' are shown by the overlaid, dashed circles 452, 454, 458, 460, 462 corresponding to WAPs 402, 404, 408, 410, 412 respectively. There is no WAP' estimate 456 because the corresponding actual WAP 406 was not found in the first phase of scanning.

Again it can be seen that WAP 406 is not mapped because of its signal visibility at any of the nine scanning locations outside of the building. The accuracy of the mapped WAPs depend on many factors such that the scanning distance, modelling of the environment, the accuracy of the user position, the number of scans (measurements) from outside the building for a WAP as well as the geometry of those places in reference to respective WAP, and so on.

Figure 5:
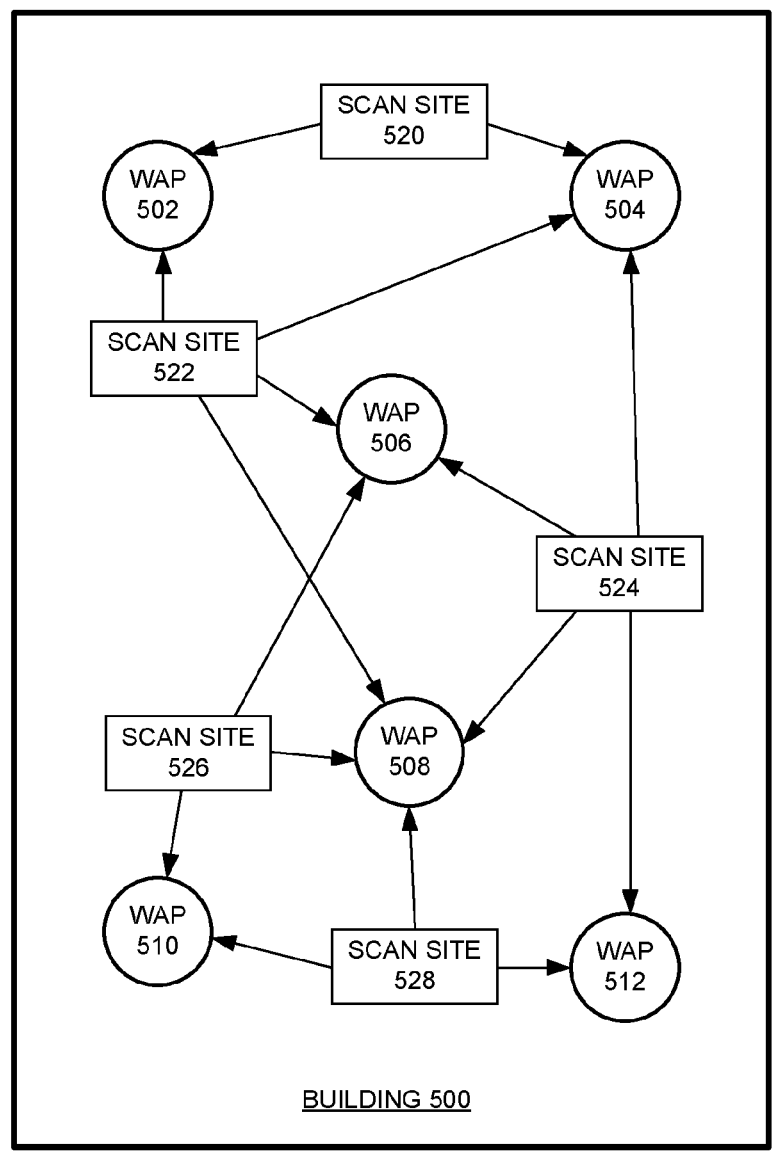
FIG. 5 is an illustration of the second phase of scanning of the set of wireless access points (WAPs) in the building of FIG. 3.

FIG. 5 is an illustration of the second phase of scanning of the set of wireless access points (WAPs) in the building of FIG. 3. In the building 500 the six WAPs 502, 504, 506, 508, 510, 512 are again shown. Five new scan sites 520, 522, 524, 526, 528 are chosen inside the building, interspersed (where possible) between the WAPs.

As mentioned, in the second phase of mapping, the scanning points are located inside the building where a user doing the mapping generally does not have GPS/AGPS availability. In this case a user's co-ordinates at these five places will be derived using Wi-Fi positioning technology. Wi-Fi positioning will use the co-ordinates of mapped (using the first phase of scanning as described above) and other available WAPs at respective places inside the building. For example, a user at place 524 will use WAPs 504, 508, 512 to locate himself using the phase 1 mapped WAPs' co-ordinates with other signal processing algorithms such as distance measurements using Wi-Fi signal strengths, environmental modelling such as through user inputs and triangulation, and so on as described above with reference to phase 1.

A user (or other operator, for example processing received survey data at a central location) has the facility to input his own estimation of the position of the second set of locations or to input a correction (where appropriate) to an automatically derived estimate of the positions (for example to correct an apparently incorrect or overly inaccurate GPS reading if available and being used). A user may also input data to enable or to enhance performance of reference positioning system such as GPS assistance data (estimated position, time, ephemerides etc) for GPS if available and being used. The user may in particular record a perceived height or other measure (such as the storey number in the building) allowing a height or other dimension to be estimated with more accuracy. If a baseline height $h_b$ is available for a particular location (for example using data derived from topographical maps), a height estimate h can be computed as $h_b + h_s \times s$, where $h_s$ is the estimated height per storey (based on a global or local average or using specific knowledge about a building at the scanning location, for example) and s is the storey number (0 being the ground floor, 1 being the first floor, and so on, using UK terminology). In one embodiment using inertial (or differential) positioning, for example, a user can when appropriate input datum (or absolute) values to allow calibration of the inertial positioning system.

The user may also in particular input a selection of environmental model to apply and/or parameters for use with such a model (see below for a discussion of some possible environmental models and their parameters). The selection of the environmental (and other data) may for example be made using drop-down menus or other input devices in a user interface (such as an interactive application running on a hand-held device carried by a user).

In the absence of sufficient points to allow triangulation or a user-supplied positional estimate, for example, other possible methods such as weighted average can be used (including if necessary a manual input by the scanner user or operator processing the data at a later stage) to obtain a 'best guess' of the scanning location.

During the second phase of scanning, all of the six WAPs 502, 504, 506, 508, 510, 512 are scanned from inside the building, on account of the closeness to the scanning user and typical absence (for example) of thick structural walls to attenuate the signal. It can be seen that many WAPs can be scanned from more than one place. For example WAP 508 is scanned from locations 522, 524, 526, 528. Similar to phase one, at every place user again records Wi-Fi scanning parameters such as signal strength, MAC addresses of visible WAPs, Signal Quality etc. and user's own position. User may also records other useful environment specific data from observation and/or prior knowledge such as height and type of building, numbers and types of physical signal obstructions close to the scanning place etc. The user may also records data from additional sensors on the device if available to assist in positioning such as magnetometer which can provide heading, barometer which can provide height information etc.

Figure 6:
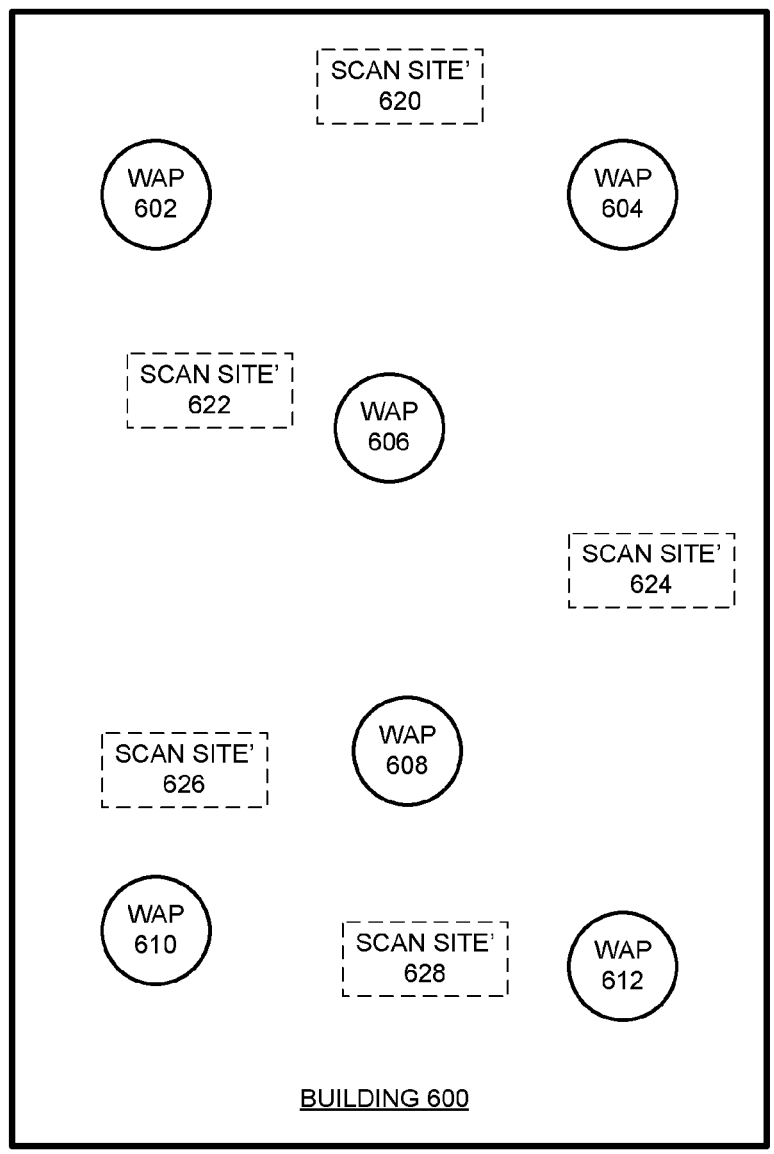
FIG. 6 is an illustration of the estimated positions of the scanner during the second phase of scanning shown in FIG. 5.

FIG. 6 is an illustration of the estimated positions of the scanner during the second phase of scanning shown in FIG. 5, in accordance with the process described above. As before the six WAPs 602, 604, 606, 608, 610, 612 in the building 600 are shown. Also shown are the estimated positions of the scanner at scan site' 620, 622, 624, 626, 628, which vary from the actual scan sites by varying degrees in dependence on the above-mentioned factors that affect the signal propagation, for example.

In a further embodiment in which the device has an Internet connection, a user's co-ordinates can also be derived using a central web-server by exchanging Wi-Fi parameters with it. In this case a central web server is operable to provide a user's location either through an internal database or from other Internet resources. In some cases the user may also use GPS/AGPS co-ordinates as well as any other positioning technology if it is available. Users can also input information such as co-ordinates, environment types, and so on (as described above regarding phase I) in the processing software to aid mapping process.

The records formed from scanning from all of the five scanning locations are processed together in a software on a device with different signal processing algorithms such as distance measurements using Wi-Fi signal strengths, environmental modelling using user inputs, triangulation, and so on to (generally more accurately) map WAPs inside the building.

Figure 7:
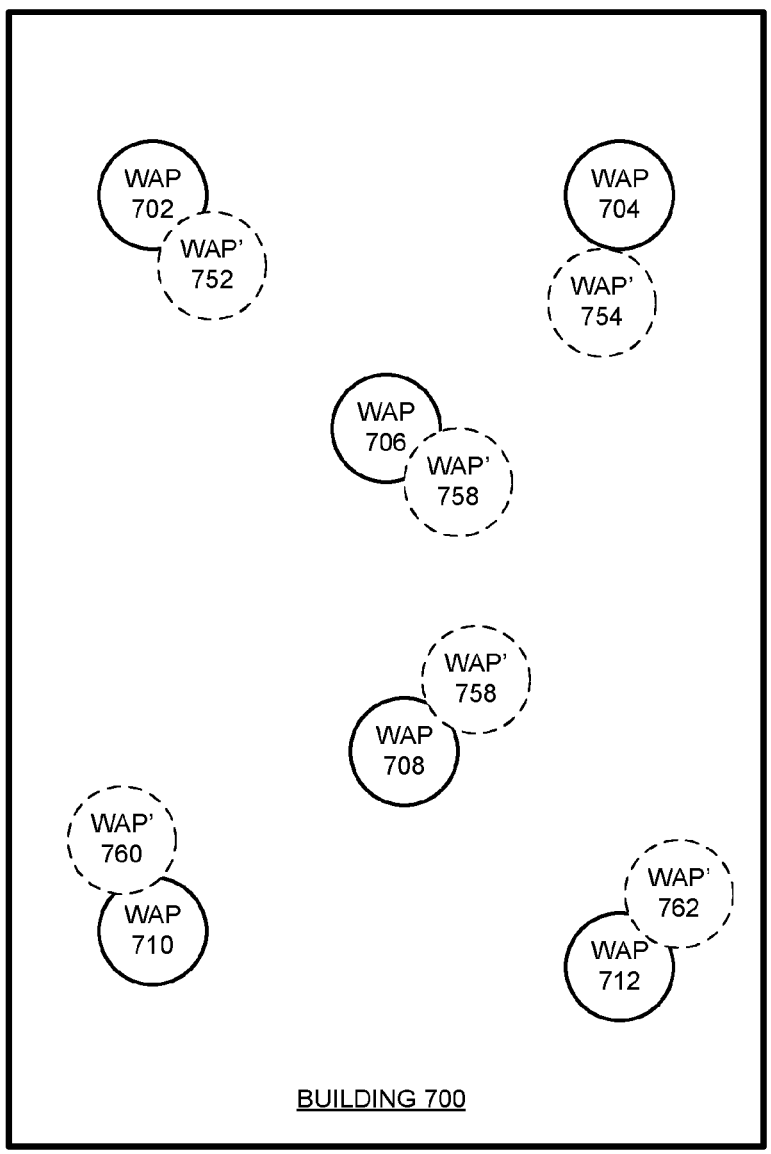
FIG. 7 is an illustration of the estimated positions of the WAPs of FIG. 3 after the second phase of scanning in the process of FIG. 5.

FIG. 7 is a schematic illustration of the estimated positions of the WAPs of FIG. 3 after the second phase of scanning in the process of FIG. 5. In FIG. 7 the actual locations of WAPs 702, 704, 706, 708, 710, 712 are shown with a solid circle, and the estimated locations WAP' are shown by the overlaid, dashed circles 752, 754, 756, 758, 760, 762 corresponding to WAPs 702, 704, 706, 708, 710, 712 respectively.

It can be noted that in this hypothetical case the estimates of the positions of the WAPs are generally improved, although in individual cases such as for WAP 704 (and estimate WAP' 754) the estimate can become less accurate with regard to the first phase (as illustrated in FIG. 4). Phase II has also mapped WAPs that were not mapped in phase I (for example WAP 706).

Though a user's co-ordinates (derived inside from Wi-Fi positioning after phase I) at scanning points may not be accurate in comparison to user's co-ordinates (derived outside using GPS/AGPS), the overall improvement of mapping accuracy and coverage of mapped WAPs are increased after second phase of mapping due to the closeness of the scanning/mapping user (inside the building) to WAPs and hence to be able to measure the distance between user and WAPs by predicting signal propagation path more accurately through applying indoor signal propagation models described above with regard to phase I.

This whole mapping process can be extended to subsequent phases to improve coverage and some level of accuracy as many times as improvements may be seen in mapped co-ordinates of WAPs. The process remains essentially the same as of phase II and can be repeated for example to rescan a previous site with more scanning locations, either inside our outside a building, for example if a particular site is identified as being a particularly difficult environment (for example after review of the initial scanning data).

Figure 8:
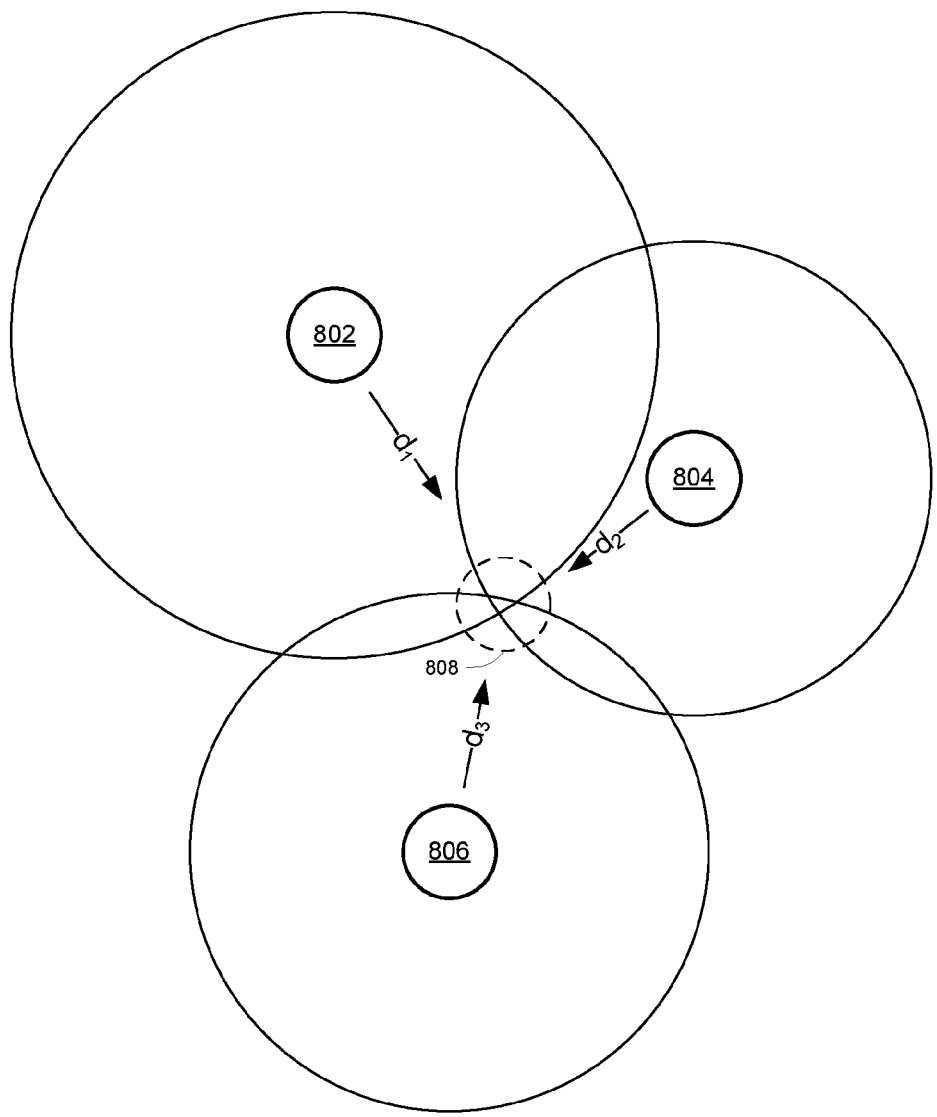
FIG. 8 is an illustration of the process of triangulating the position of a wireless access point (WAP)

FIG. 8 is an illustration of the process of triangulating (in 2D) the position of a wireless access point (WAP). This is one of the possible methods for estimating the position of the WAP. In FIG. 8 three scanning sites 802, 804, 806 are shown, each detecting a signal from a WAP in the approximate region 808. The WAP/region 808 is at a distance $d_1$, $d_2$, $d_3$ from respective scanning sites 802, 804, 806. Each site 802, 804, 806 is surrounded by a circle representing the locus of all points at distance $d_n$.

Here, $d_1$, $d_2$, $d_3$ are derived from any of the available distance measurement models described earlier and are used together with location co-ordinates of sites 802, 804, 806 in the following equation:

$$d_i = \sqrt{(x_r - x_{si})^2 + (y_r - y_{si})^2} \qquad (6)$$

Where $d_i$ is the distance, $x_r$ and $y_r$ are the x and y co-ordinates of WAP 7 and $x_{si}$ and $y_{si}$ are the x and y co-ordinates of places, where i is 1, 2, ..., n. Three equations are formed and solved for x and y co-ordinates of the WAP in region 808. These equations can be solved with any available methods such as the least squares method.

As shown in FIG. 8, the mapped co-ordinates for the WAP in region 808 are where the three circles (the loci of the estimated distances between the sites and the WAP) overlap. The circles do not overlap at a single point because of errors in the measurement/estimation of the distances $d_1$, $d_2$, $d_3$ and possible errors in the reference (or estimated) co-ordinates of the scanning sites 802, 804, 806.

It will be appreciated that the above 2D example can be extended into 3 dimensions as required. It is not normally required to record the three-dimensional position of a WAP (merely the two-dimensional position) but it will be appreciated that the relevant modifications can be made if a 3D location is required.

Figure 9:
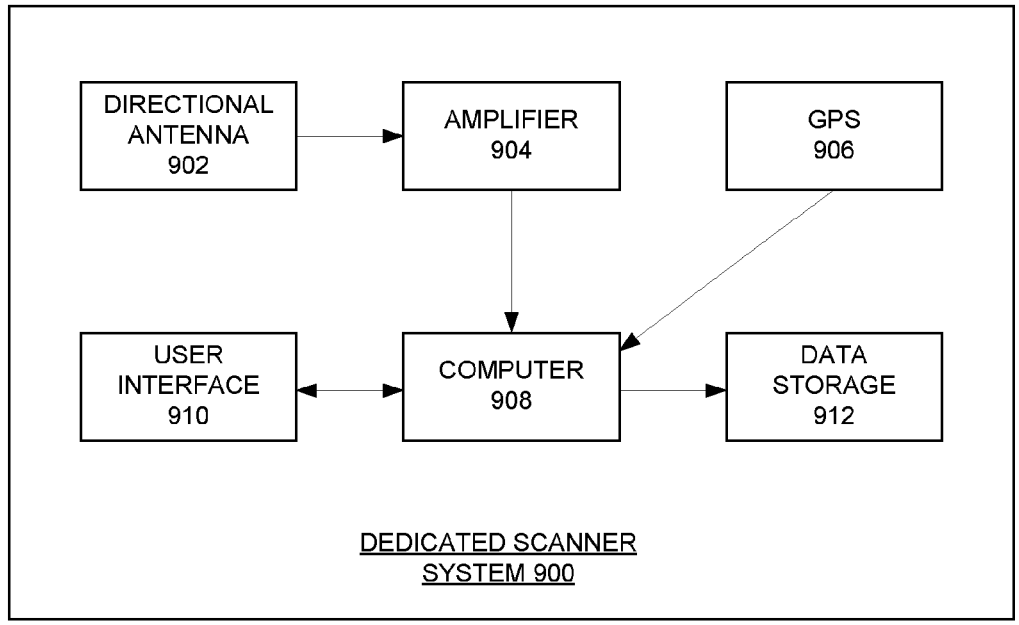
FIG. 9 is a schematic illustration of a dedicated scanner system suitable for use with the first phase at least of the process of FIG. 2.

FIG. 9 is a schematic illustration of a dedicated scanner system suitable for use with the first phase at least of the process of FIG. 2. This scanner may be used in some or all of the embodiments described above in preference to a handheld unit (which may or may not be the same unit as the unit described below in relation to FIG. 10).

In FIG. 9 the dedicated scanner system (such as a wardriving rig) includes a directional antenna 902 (such as a direction Wi-Fi antenna), amplifier 904 for amplifying signals from the antenna, a GPS (or AGPS or other similar unit) 906 for providing reference coordinates of the scanner system 900, a computer 908 for controlling and/or processing and/or receiving data from any or all of the antenna 902, amplifier 904, GPS unit 906, a user interface 910 for controlling the scanner system, inputting relevant data and displaying results, and a data storage unit 912 for storing records created by the scanning process. In an alternative embodiment a network interface unit (not shown) is provided to allow data to be sent and/or received via a communications network, for example to allow remote control and/or data collection, which may obviate the need for the storage unit 912 for example.

Figure 10:
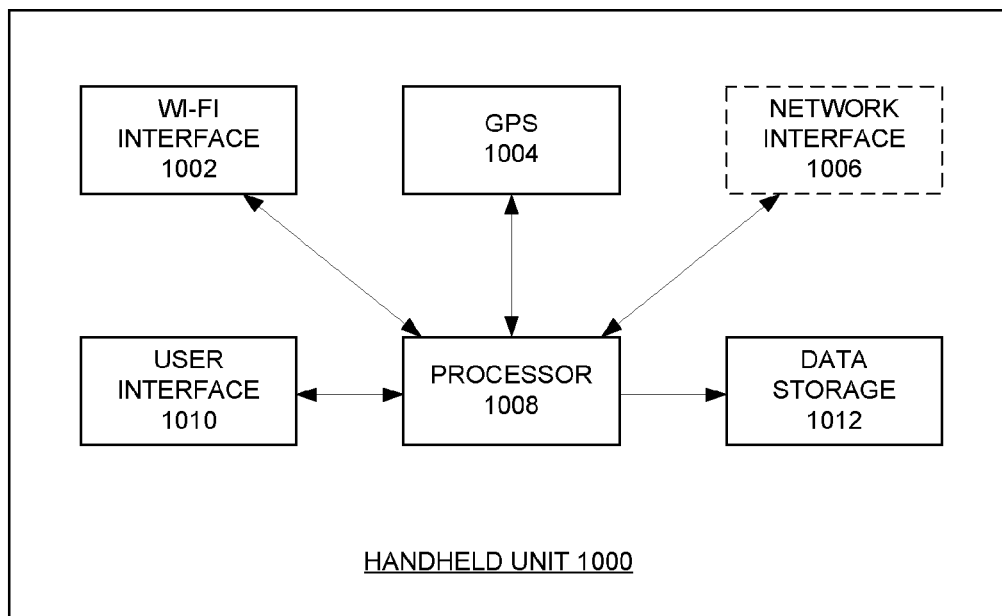
FIG. 10 is a schematic illustration of a handheld unit suitable for use with the first and second phases of the process of FIG. 2.

FIG. 10 is a schematic illustration of a handheld unit suitable for use with the first and second phases of the process of FIG. 2.

The handheld unit includes a Wi-Fi interface 1002, a GPS or AGPS unit 1004, a network interface 1006 (which may optionally not be present for a purely local operation of the scanner), a processor (or microcontroller or other computerised device) 1008, a user interface 1010 and a data storage unit 1012. This unit may have less selectivity, signal amplification and/or processing power or storage capacity compared to the device described above in relation to FIG. 9, but may on the other hand be more portable and therefore easier to bring into closer contact with any WAPs that require scanning. In a further embodiment the handheld unit may omit or deactivate the GPS/AGPS unit 1004, for example if used only during the second phase of scanning.

In a further embodiment a scanner unit may be provided which mixes features from both the scanner system 900 described above in relation to FIG. 9 and the handheld unit 1000 described above in relation to FIG. 10.

Figure 11:
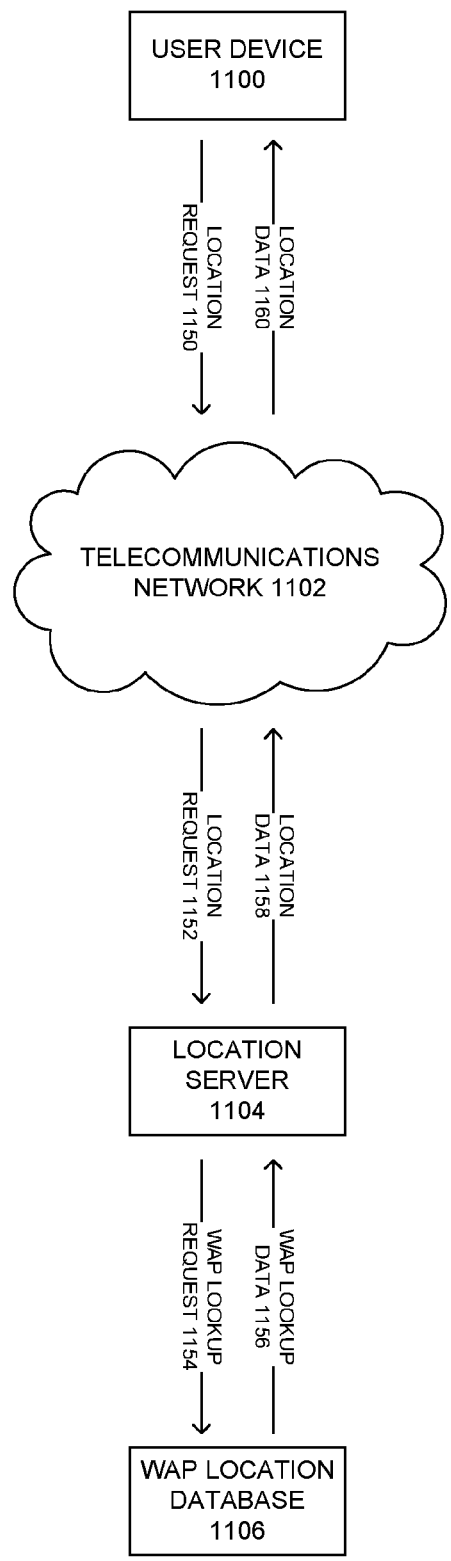
FIG. 11 is an overview of a system for locating a user device using the data generated by the process of FIG. 2.

FIG. 11 is an overview of a system for locating a user device using the data generated by the process of FIG. 2.

In FIG. 11 a user device 1100 (such as the handheld device 1000 described above or any other device, for example), a telecommunications network (such as a mobile telephone network) 1102, a location server 1104 and a WAP location database 1106 (which may be integrated with the location server 1104) are shown.

In use, a user causes the user device 110 to send a location request 1150 to the telecommunications network 1102 (for example using a service on a mobile telephone). The request 1150 may typically include data received at the user device 1100, such as properties (such as those described above with regard to phases I and II above) of signals detected from nearby WAPs. The request 1150 may thus, for example, include details of the signal strengths of nearby WAPs and MAC addresses (and/or cell tower signals, and so on).

A request 1152 (usually the same as the initial request 1150) passes from the network 1102 to the location server 1104. The location server 1104 then processes the request 1152 and in so doing interrogates the location database 1106 with a WAP lookup request 1154, to specify WAP data that is relevant to the location request 1152. The database 1106 then returns the requested data 1156 to the server 1104. The server finishes processing the data 1156 in conjunction with the received request data 1152 to produce a location estimate which is sent back to the user device 1100 in the form of location data 1158. The network forwards location data 1160 (usually the same as the data 1158) to the user device 1100. The user device can then process the location data 1160 to retrieve (and for example display) the location estimate.

The system described above with reference to FIG. 11 may also be used in the initial 'discovery' phases, for example in conjunction with the phases I and II described above. The server 1104 may for example additionally or alternatively operate software to process the scanning data to produce the various estimates described above.

In some applications, the data obtained during the second phase of scanning may be used to determine one or more locations where it would be advantageous to locate a further electromagnetic signal source (e.g. a Bluetooth beacon) to improve the accuracy of the location data provided to a user device at one or more locations. A further electromagnetic signal source can then be provided at a location thereby determined. A further phase of scanning according to the invention may then take place at a plurality of locations around the newly placed electromagnetic signal source.

It will be appreciated that other applications of the position location system described above are of course possible, for example including location systems that are entirely local to a user device (for example including all relevant data and processing power in the user device), and devices that communicate via a variety of various different networks (not limited to one or to a telecommunications network, for example).

In the description thus far, a method has been described of determining position co-ordinates of Wireless Access Points (WAPs) in Wireless Local Area Networks (WLANs) using a multiphase self correcting mapping process. The WAPs are typically Wi-Fi Access Points in respective WLANs, but they may be other WAPs of another Wi-Fi based position system. The method and system may be implemented fully on a consumer mobile device, for example, or may rely on remote components and software (such as a central server connected via some form of communications network, such as a Wi-Fi, mobile telephone or other network) to achieve the same aims.

An embodiment will now be described in which positioning data, and a position estimate derived therefrom, can be improved.

Figure 12:
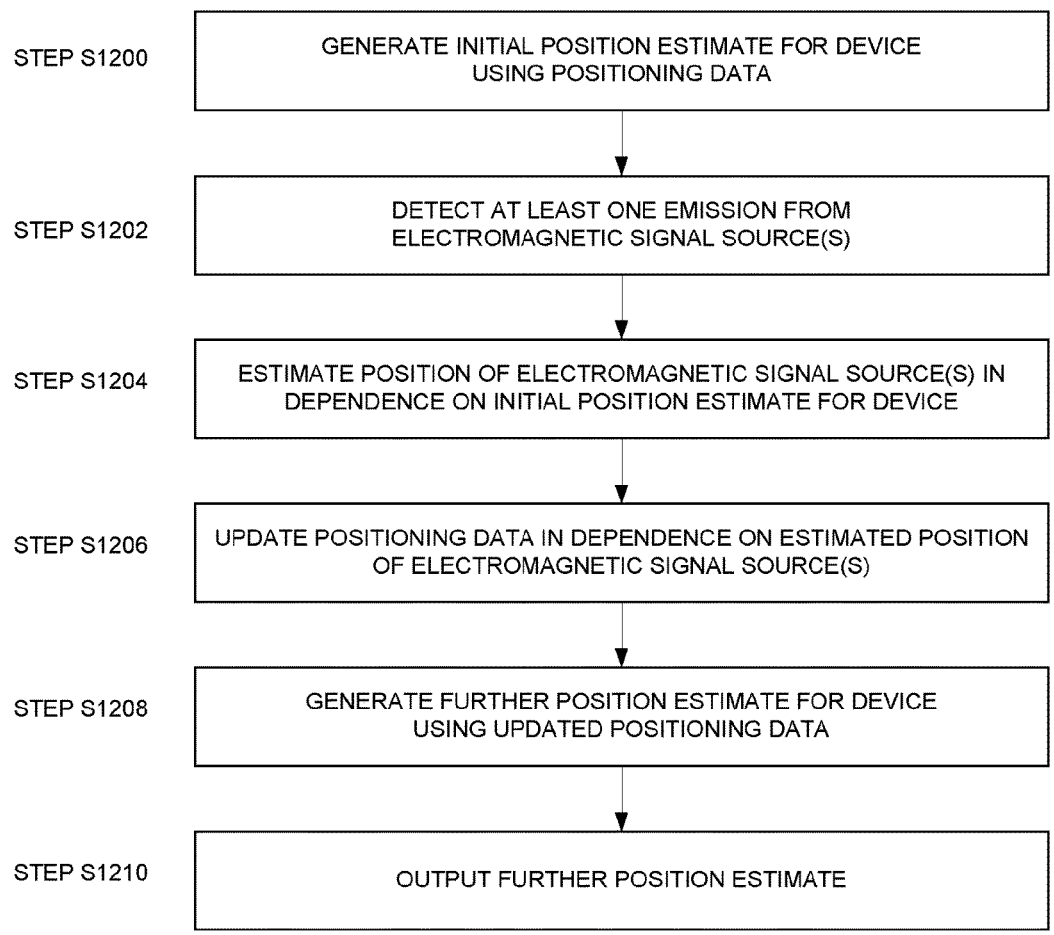
FIG. 12 is a flowchart illustrating a process for improving a position estimate of a user device in the system of FIG. 1.

FIG. 12 is a flowchart illustrating a process for improving a position estimate of a user device in the system of FIG. 1. This process is typically effected using the user device as described above but may be carried out by any other appropriate device and/or divided as appropriate between one or more devices local to a user and one or more servers or other devices remote from the user, for example accessed via a communications network such as a telephone network or Internet connection.

In Step S1200, an initial position estimate is computed for the device using positioning data, using any appropriate method described above, but typically by using a method such as triangulation, and using signals received from electromagnetic signal sources in the vicinity of the device; alternatively methods such as GPS positioning may be used. The positioning data is typically temporary data (typically stored on the device) that relates to wireless access points (WAPs) or other beacons and/or wireless transmitters in the vicinity of the device. This data is downloaded to the device on start-up, for example, periodically, or in response to predefined conditions (such as the device moving a certain amount or direction), and may be done so in response to a request from the device, which may or may not specify the extent of the data that is required (the amount of data may to transfer may be determined with reference to the physical memory, storage and/or processing capacity of the device, which may be specified in the request, if present). In a variant, the temporary data is stored at least partly remote from the device, and may for example be set aside on a server dedicated to the purpose. The temporary data may also be generated in part or fully, either by the device or remotely, from other data. Typically the large datasets regarding WAPs and other beacons or transmitters that may be stored on a main location server will be filtered down (by the same server, a different server, or the device, for example) to the bare essence of data required to undertake a position estimate at the device. Such a filtering process also reduces the bandwidth required to transfer the data to the device (if applicable).

In step S1202, which may be carried out in some cases prior to step S1200 and combined with the position estimation step as described elsewhere, at least one emission is detected from a respective electromagnetic signal source(s), such as WAPs, wireless beacons and transmitters (such as cell phone towers and the like). The signal source may be known, and may for example feature in the positioning data (temporary or remote), or it may be a hitherto unknown or only partially verified signal source. Thus the method can apply equally to 'mapping' new signal sources and to re-estimating existing data (ideally to improve the accuracy further, for example by multiple re-estimations that may be carried out at more than one device or by more than one person).

In step S1204, the position(s) of the electromagnetic signal source(s) are estimated in dependence (amongst other things) on the initial position estimate that was computed in step S1200. Information relating to electromagnetic signals sources in the vicinity may also be used to compute or refine the position estimate, for example using signals received during the course of step S1202 or as part of the estimation process in step S1200 (as described above). The estimation may for example be carried out by a remote location server based on raw signal data transmitted to it by the user device (if a connection is available).

In step S1206, the positioning data (which may be temporary) is updated using the position estimates of the electromagnetic (EM) signal sources that have just been computed. This step may for example comprise storing a new entry in a database containing information about a WAP or other EM source, such as estimated position, approximate accuracy of estimation, signal strength, identifying signal, a user estimation of location (corroborating the position estimate or otherwise), and so on. Alternatively, for example if the position of a previously-known EM source is being updated, and appropriate database entry (or other data entity) may be partially or completely updated as appropriate. The updating of the data may alternatively or additionally occur remote from the device, for example by means of a data transmission to a central server from the device. This transmission may comprise the data that has been created or updated as mentioned above, or it may contain raw data that allows the server to carry out this task. In this example, and with more general application, functionality and data may as appropriate be divided between multiple servers or other devices using any appropriate distributed computing techniques known in the art.

In step S1208, which may in some cases be optional, a further (typically improved) position estimate is generated using the positioning data (locally and/or remotely as appropriate and as described above). In particular, a new electromagnetic signal source (that is, a WAP, wireless beacon or transmitter, and so on) whose position has been estimated in step S1204 may be used substantially immediately to create an updated position estimate for the user device. In one variant in which updated positioning data is transmitted to a location server (or similar), the updated user device position estimate is calculated prior to this transmitting step (or at least prior to a step of receiving any further updates of positioning data from the location server.

In step S1210, the updated position estimate is outputted, for example visually displayed to the user, or passed to applications and the like on the user device (such as a map interface and the like) which require the estimate.

Some examples of the use of the above process will now be described.

Figure 13:
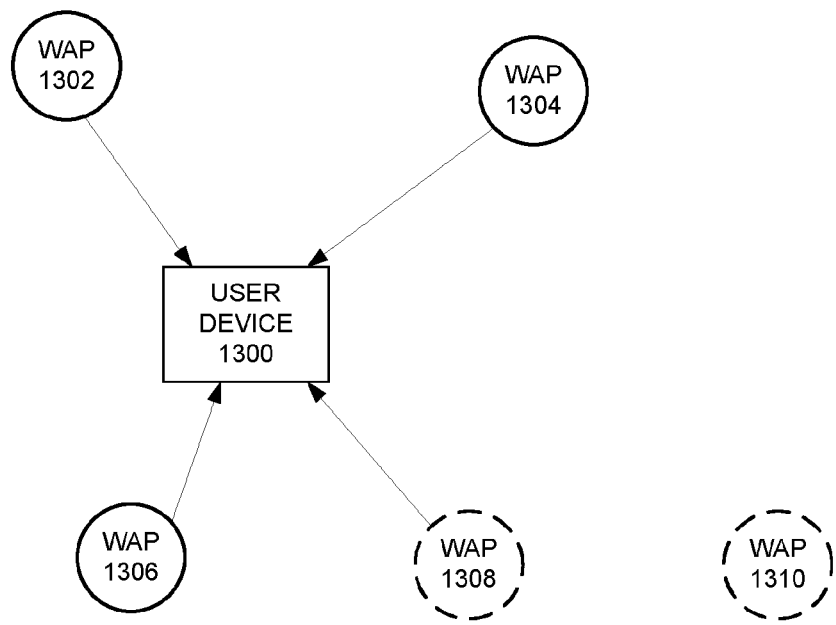
FIG. 13 is an illustration of the process of FIG. 12.

FIG. 13 is an illustration of one example of the process of FIG. 12. A user device 1300 is shown, which in this example is a user device as previously described. Three 'known' WAPs 1302, 1304, 1306 are shown, as are two 'unknown' WAPs 1308, 1310. By 'known' it is meant that data relating to the WAPs is present either at a location server or (more typically) locally at the user device, for example in temporary positioning data as described above. 'Unknown' WAPs (shown in broken outline) are partially or fully absent from the positioning data (local or remote) and thus are not normally used ab initio to calculate position estimates of the user device. As is indicated in the diagram, the user device 1300 receives electromagnetic signals from the WAPs 1302, 1304, 1306, 1308. The user device 1300 may for example have reached its current position if carried by a user. The device may, for example, have just left an area with GPS reception (which can in some instances be used as an additional positioning system by the device, as described above) and now rely on positioning by triangulation and the like using WAPs and other electromagnetic sources.

Applying the process described above in relation to FIG. 12 (and elsewhere), the user device can estimate the position of formerly unknown WAP 1308, and then updates the positioning data so that WAP 1308 becomes a 'known' WAP. This can immediately allow an improved or at least revised position estimate of the user device to be computed. At this point, later on, or not at all, the updated positioning data can be transmitted in appropriate format to a remote location server. The user device may for example be outside normal communication range (if, for example, it uses mobile telephony and is currently located inside a building with poor mobile signal reception) and may, for example, transmit positioning data updates to a central server when reception is resumed. In the meantime the user device is able to make (substantially) immediate use of the new data. This is illustrated further in FIG. 14.

Figure 14:
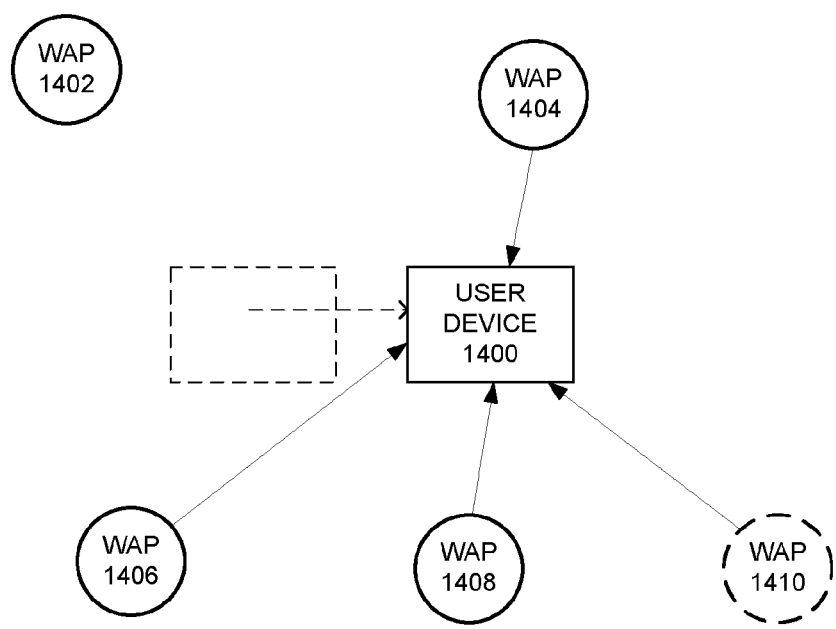
FIG. 14 is a further illustration of the process of FIG. 13.

FIG. 14 is a further illustration of the process of FIG. 13.

In FIG. 14, a user device 1400 is shown, as before, as well as 'known' WAPs 1402, 1404, 1408 and 'unknown' WAP 1410. In this example WAP 1408 is 'known' on account of the processing carried out on a previous iteration, as discussed above in relation to FIG. 13. In this example the user device has moved into a new position where it now receives signals from WAPs 1404, 1406, 1408, 1410, though as a general principle it is not necessary for the user device to move. Applying the process described above, a position for the WAP 1410 is estimated, based in part on the position estimate for WAP 1408 that has been computed previously. This new estimation may be carried out prior to any synchronisation between the user device and a remote location server, that is to say relying purely on modifications to positioning data stored locally. In addition, the position of WAP 1408 and any other WAP may be re-estimated in the same iteration of detection and processing.

Figure 15:
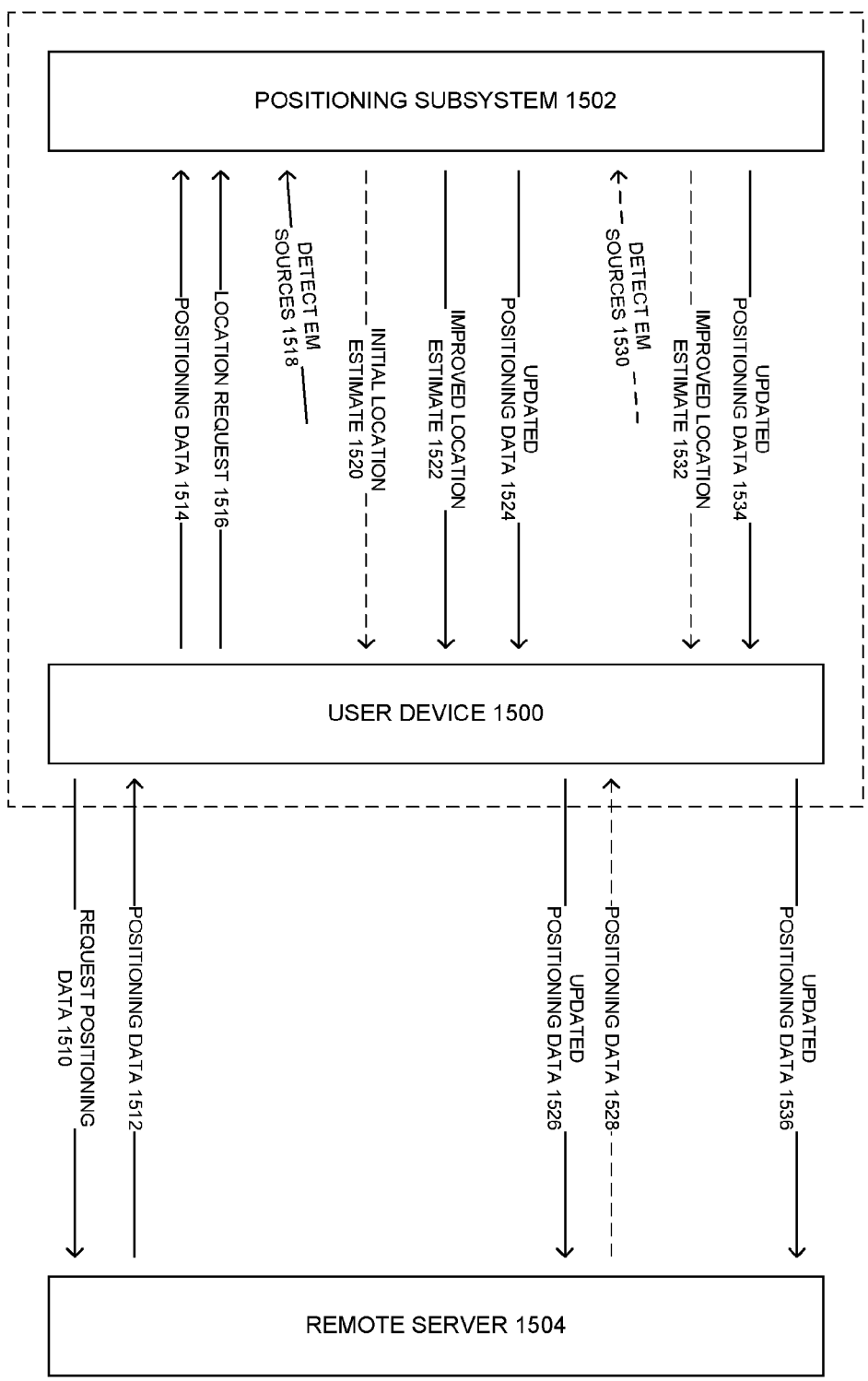
FIG. 15 is an overview of a system for carrying out the process of FIG. 12.

FIG. 15 is an overview of a system for carrying out the process of FIG. 12. This figure illustrates a typical operation of this aspect of the user device, but it will be appreciated that this sequence of events is exemplary only and that alternative sequences may be envisaged. Events that are (in at least some cases) optional are indicated with a dashed line.

A user device 1500 (such as a device as described above), positioning subsystem 1502 (including for example a GPS component and a wireless beacon triangulation system) and remote server 1504 (typically a location server as described above) are shown. The positioning subsystem may be provided solely in the user device 1500 or at a remote location (such as the remote server 1504 or another server), or any appropriate combination of the two.

During initialisation, for example, the user device may request positioning data 1510 from the remote server 1504 (although in a variant the data may be stored in non-volatile memory in the device and/or received without needing to transmit a request). The positioning data 1512 is transmitted to the user device by the remote server 1504, and is typically a subset of data relating to electromagnetic signal sources in the vicinity of the user device, or a data set from which the user device can filter out such local data. The user device 1500 forwards the positioning data 1514 as appropriate to the positioning subsystem 1502 (it will be appreciated that the distinction between the user device 1500 and subsystem 1502 is arbitrary in some cases and that steps such as step 1514 may be omitted as appropriate).

The user device 1500 then issues a location request 1516 to the positioning subsystem 1502, for example in response to an application request. As is described elsewhere, the positioning subsystem 1502 detects electromagnetic signal sources 1518 and uses these in conjunction with the positioning data in order to arrive at an initial location estimate for the user device. In some cases the initial location estimate 1520 is passed to the user device, for example if there is an urgent need for a position estimate, albeit provisional, but in other cases the initial position estimate may is used only internally within the positioning subsystem 1502. After the steps described above are carried out, an improved location estimate 1522 is sent to the user device.

In this example, updated positioning data (a list of changes, or a full data set as appropriate, but normally the former) is sent 1524 to the user device 1500. The device then transmits the updated positioning data in an appropriate format 1526 to the remote (location) server 1504. Revised positioning data may be sent back in return 1528, which may then be forwarded on (not shown) to the positioning subsystem 1502. These events 1524, 1526, 1528 may alternative be deferred or omitted, depending on circumstances, for example in the event that there is no communications link at that time between the user device 1500 and remote server 1504. If revised positioning data is sent back to the device 1528, the data may have been modified to incorporate recently computed location estimates of the user device and/or newly discovered or remapped WAPs (or other EM sources) and/or location estimates computed by other devices, for example as a result of 'crowdsourcing' location estimates.

Further position estimates may then be obtained, optionally by re-detecting electromagnetic signal sources 1530 and/or by repeating the previous estimation steps using the optional new positioning data (if appropriate) to output an improved location estimate 1532.

At a later stage, for example in response to further refinements as illustrated in FIGS. 13 and 14, updated positioning data may again be transmitted 1534, 1536 to the remote server 1504.

Further aspects of the mapping and updating process will now be described.

Figure 16:
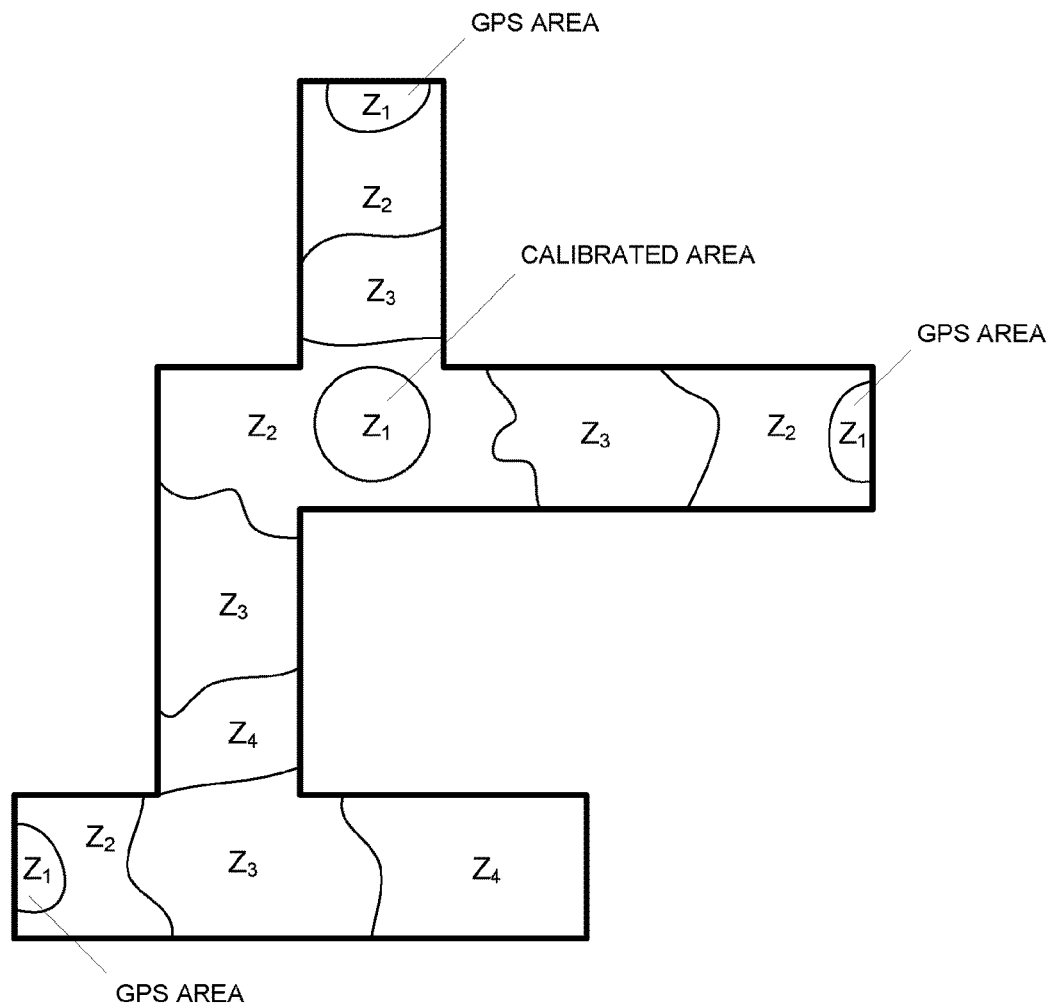
FIG. 16 is an illustration of a division of a building into signal emitting zones.

FIG. 16 is an illustration of a division of a building into signal emitting zones.

In the present embodiment, all signal sources are assigned a zone identifier ($Z_1$, $Z_2$, $Z_3$, . . . $Z_n$) to assist with maintaining and updating the location database held by the location server (and/or a partial, local copy thereof at a user device). The identifier is essentially one of a number of labels which, for convenience, are arranged in sequence.

The first label, in this case $Z_1$, is applied to wireless beacons (or other electromagnetic signal sources) which are located in areas where position accuracy is above a certain threshold, for example where a satellite positioning system is available or within a well calibrated area. These locations can be considered to be zone 1 (or, as noted, any other arbitrary label). A characteristic of this zone is that the margin of error in the position estimates is sufficiently low that the position estimates are essentially 'trusted' and can freely be used as the basis of other position estimates.

The second zone, zone 2 ($Z_2$) encompasses beacons (or other sources) which do not fulfil the criteria to be zone 1 (for example because they are new, or because their locations are not possible to verify to a sufficiently high degree of accuracy using other methods such as GPS, for example because they are indoors) but which are within detection range (such as 100 meters, 200 meters, and so on) of sources in zone 1. The position of beacons in zone 2 are typically estimated using multiple readings of distance to the beacon as the user moves around, combined with the known position of zone 1 beacons and other zone 2 beacons which have already been identified.

Areas in which a significant number of beacons are unmapped, to the extent that reasonable position estimates cannot be obtained using pre-existing location databases, are referred to herein as 'void zones'. Zones 2 and above are typically 'void zones' (since areas which are sufficiently calibrated to give very accurate position estimates are considered to be zone 1).

As the user moves further into the void zone, away from zone 1, they may identify further beacons that are not within detection range of zone 1. They can be detected by beacons in zone 2. These beacons are allocated the label 'zone 3', and so on, as the user heads further into the void zone.

Eventually, a user may reach a location where they find further zone 1 beacons. For example, they may reach another exit of a building and re-establish GPS positioning or reach an accurately calibrated zone. A building may have an internal region where there are zone 1 beacons, for example if there is an open garden where GPS positioning can be established. There may alternatively or additionally be a beacon having a calibrated position (which might already be known, or transmitted by the beacon for example), and so on.

A user walking through the building may record beacons in a total of six zones, say, which would be labelled zone 1, zone 2, zone 3, zone 4, zone 5 and zone 6. On contact with zone 1, these zones can then be relabelled as zone 1, zone 2, zone 3, zone 4, zone 3 and zone 2. Clearly the higher the zone number, the more unreliable the position estimates normally will be, and so being able to 'bridge' between two areas of zone 1 will normally improve the accuracy of the system overall. In FIG. 16 the different zones $Z_1$, $Z_2$, $Z_3$ and so on, and the effect of bridging in an example building can be seen.

When such a 'bridge' is built, the approximate locations of the beacons in the newly discovered zone can be corrected now that an accurate end position of the user can be re-established and the best estimates stored in the database for immediate use (or essentially immediate, say within seconds, minutes or hours) by others. A number of different methods for re-estimating locations based on bridging information can be combined depending on the circumstances. This will now be illustrated in more detail with reference to a special case where data from two users is pooled, leading to more efficient estimation and updating.

FIGS. 17*a* to 17*d* are illustrations of the concept of bridging between known signal sources.

In these figures, the path of two users are shown travelling through a corridor that forms a 'void zone'. Known and/or estimated positions of WAPs are illustrated in these figures with a four-pointed star.

Figure 17A:
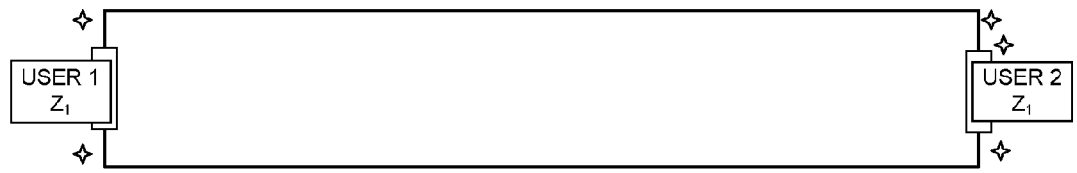
FIGS. 17a to 17d are illustrations of the concept of bridging between known signal sources.

In FIG. 17*a*, a first and second user (USER 1 and USER 2) are shown at opposite ends of the corridor, in zone 1 ($Z_1$), where the position of the available beacons (shown as four-pointed stars on the figure) is known with high confidence.

Figure 17B:
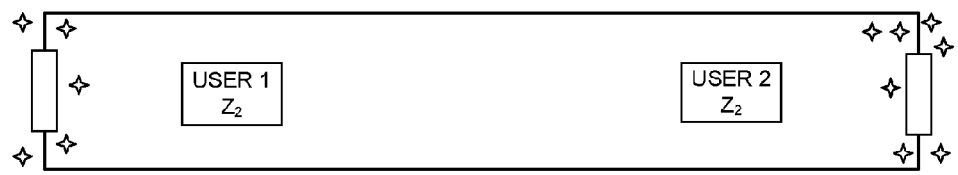

In FIG. 17*b*, the users enter zone 2 ($Z_2$), where they are still able to detect the beacons in zone 1, and also others in the vicinity (also shown), whose position can be estimated with a more limited degree of accuracy.

Figure 17C:
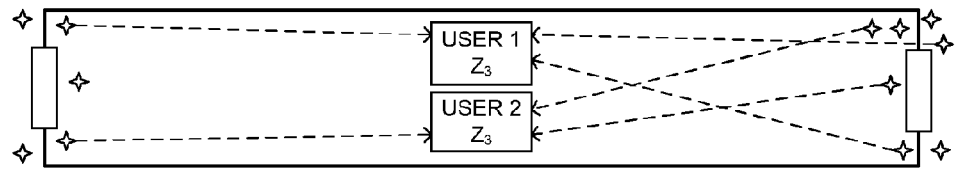

In FIG. 17*c*, the users meet in zone 3 ($Z_3$), where they are only able to estimate their position based (substantially only) on the beacons whose position they had estimated in the previous step, while in zone 2. The dotted lines indicate the signal paths of the signals that are received by USER 1 and USER 2. In this example the first user is shown as receiving a signal from a beacon in zone 1; it will be appreciated that the classification of beacons into zones is approximate and need not be rigorously applied. In this case, combining the data received by the first and second users allows the bridge to be formed. Appropriate methods can then be used to re-estimate the position of the formerly unknown WAPs, based on the new information regarding the distance between the two exit points to zone 1 and the signal data received inbetween. Further refinements can then more easily be made to the position estimates.

Figure 17D:
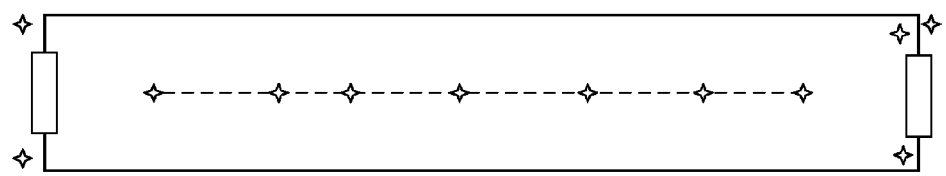

In FIG. 17d, the position estimates for intermediate WAPs (that is, WAPs on the bridge between the two zone 1 areas) are illustrated. The combined signal data from the two users, forwarded back to the location server or, in a variant, shared between the users, allows at the very least an approximate estimate of the relative distances between the unmapped WAPs. In a very simple approximation, the unmapped WAPs are then mapped onto the dotted line between the two zone 1 areas which was (approximately) followed by both users, in concordance with the approximate relative distances between the WAPs as recorded by the users. Position estimates can later be improved when necessary, for example by moving laterally within the corridor as well as moving along it in a straight line.

In the above example two users were shown, but it will be appreciated that the process can be carried out by any number of users, including only one user, who may for example walk back and forth to obtain the desired effect. The process can be improved if the users carrying out the bridging process are monitoring their position and, for example, supplying their own approximate position estimates based on a crude estimation by eye, and the like, and/or an estimate of the distance between each other. Bridging typically takes place indoors, between outdoor areas where GPS is available. Thus, measurements can be made along a path extending between two regions of high confidence enabling an estimate of the position of multiple beacons along that path arising from a single trip by a user.

An embodiment will now be described in which the location server carries out the majority of processing functions and carries out specific functions to achieve the bridging described above (though as before, this arrangement can be varied as appropriate). These features can result in improved position estimates with relatively little processing and with relatively little delay. In this context it should be noted that many of the measurements which are made by users will be in regions where the master database is already very accurate. Only some measurements will be made in regions where the master database is inaccurate or has omissions. Measurements in the latter case will typically be processed in real time. Measurements in the first case may not all be processed, or processed only in periodic batch processes.

In order to provide a dynamic learning system, the central database ideally needs to be refreshed and refined as soon as any user has used the system. Because crowd source positioning systems are usually used by large numbers of users, there is a major challenge to process such massive data sets every time they are submitted. For example, when the system receives scan data from, say, 100 users at the same venue (airport, shopping centre, and so on), it is more likely to receive many scans for the same beacon at the same time. Some areas would not benefit from the dynamic updates at the same level as other areas. To address these challenges, in one variant there are two processes running in parallel on the location server(s).

Figure 18:
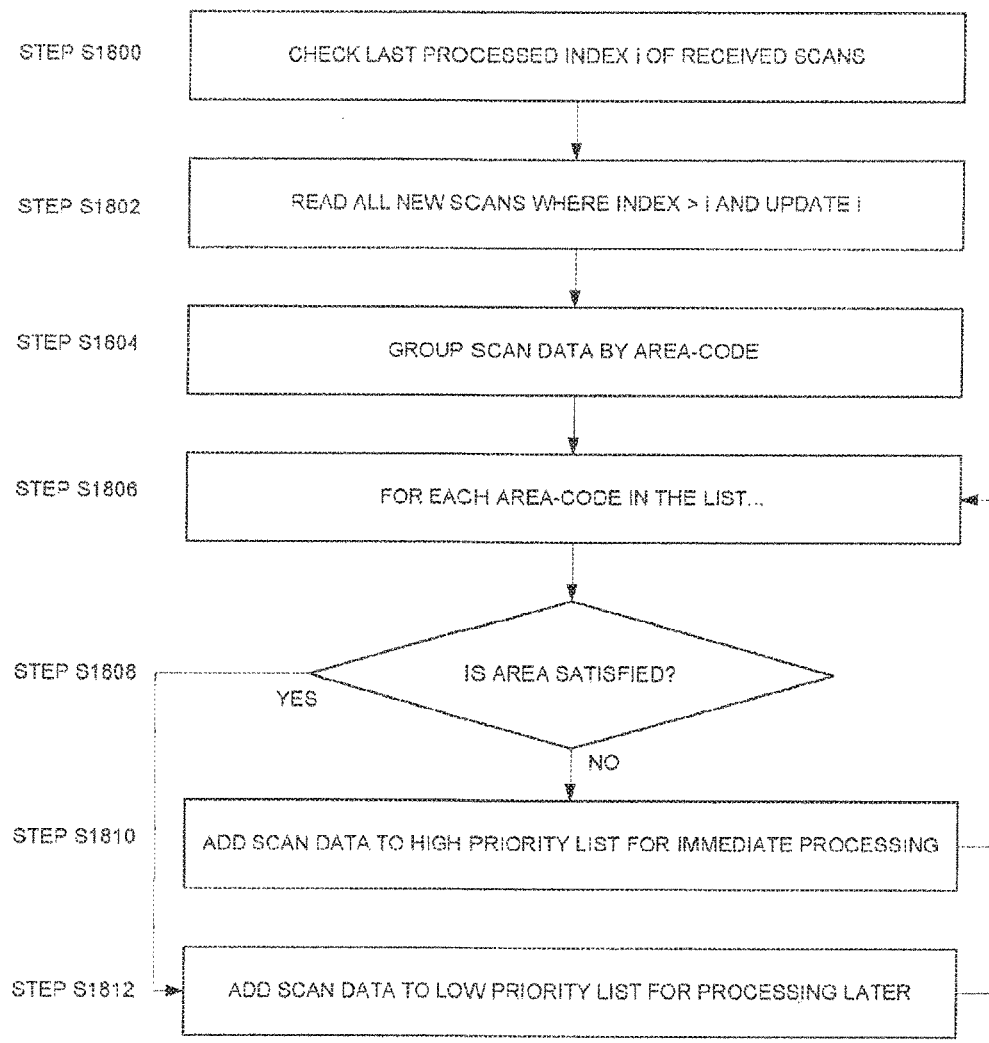
FIG. 18 is a flowchart of a process for prioritising updates to a location database.

FIG. 18 is a flowchart of a process for prioritising updates to a location database. This is the first of the two processes mentioned above.

In step S1800, the server checks the last processed index (i) of received scans. In step S1802, the server reads all new scans having an index greater than i, and then updates i appropriately. In step S1804, the scan data is grouped by 'area-code' attribute (functioning as an identifier of geographic region). Then, for each area-code in the list (S1806), the server determines (S1808) if the area is satisfied (in terms of having a sufficient number and a sufficient quality of position estimates). If not (S1810), the scan data is added to the high priority list for immediate processing by the second process (see below). Otherwise (S1812) the scan data is added to the low priority list for processing later.

Figure 19:
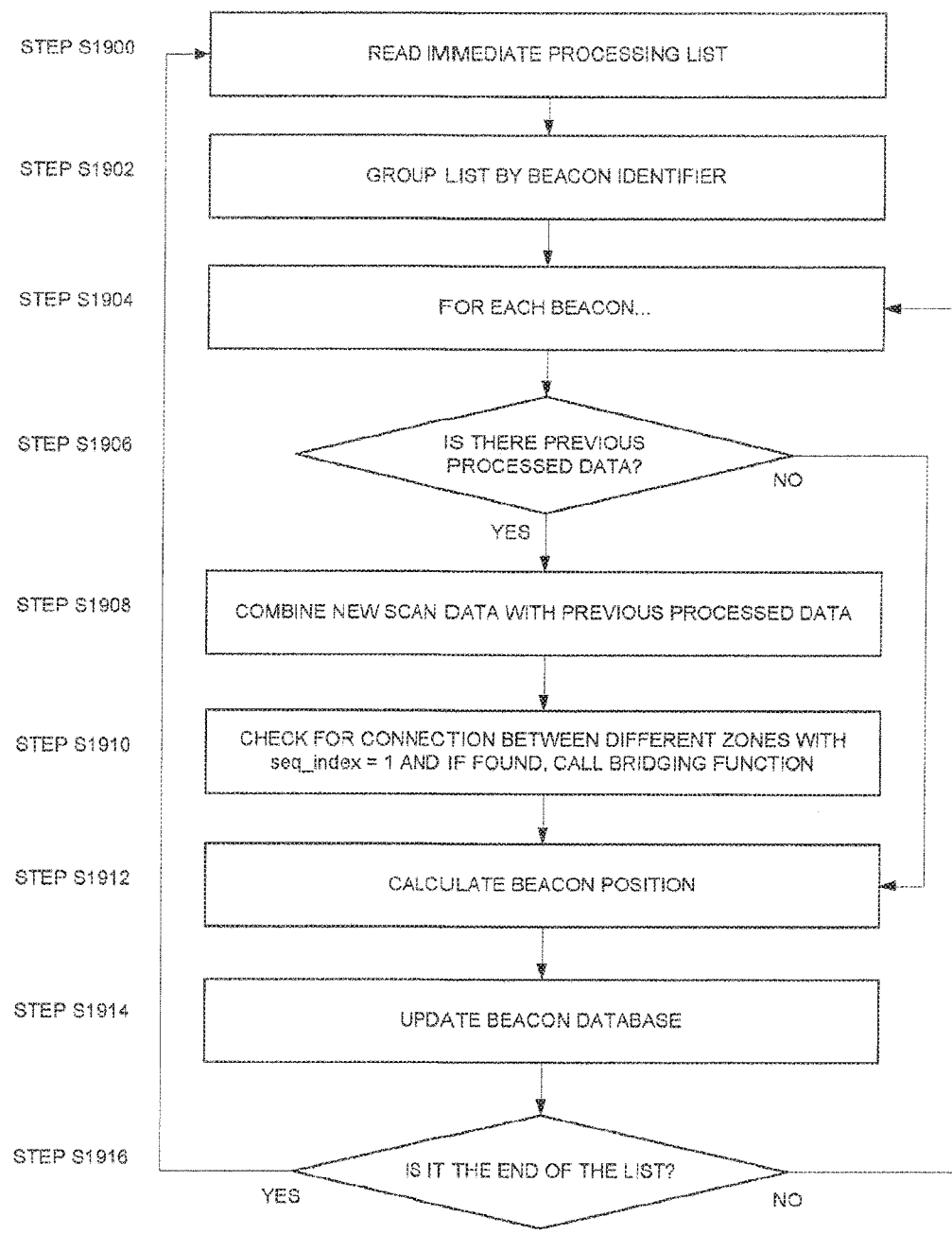
FIG. 19 is a flowchart of a process for updating a location database.

FIG. 19 is a flowchart of a process for updating a location database. This is the second of the two processes mentioned above.

In step S1900, the server reads the immediate processing list mentioned above in relation to FIG. 18. The list is grouped (S1902) by beacon identifier. Then, for each beacon (S1904), the server determines (S1906) if there is any previous processed data. If so, the new scan data is combined with the previous processed data (S1908) and then the server checks for a connection between different zone 1 areas (that is, in this case, areas with attribute seq_index=1), and then, if so, calls (S1910) a bridging function (as described above). The server then calculates the beacon position (S1912), and updates (S1914) the beacon database (otherwise known as the location database), and then loops back to step S1906 if the end of the list has not yet been reached, otherwise looping back to step S1900.

Figure 20:
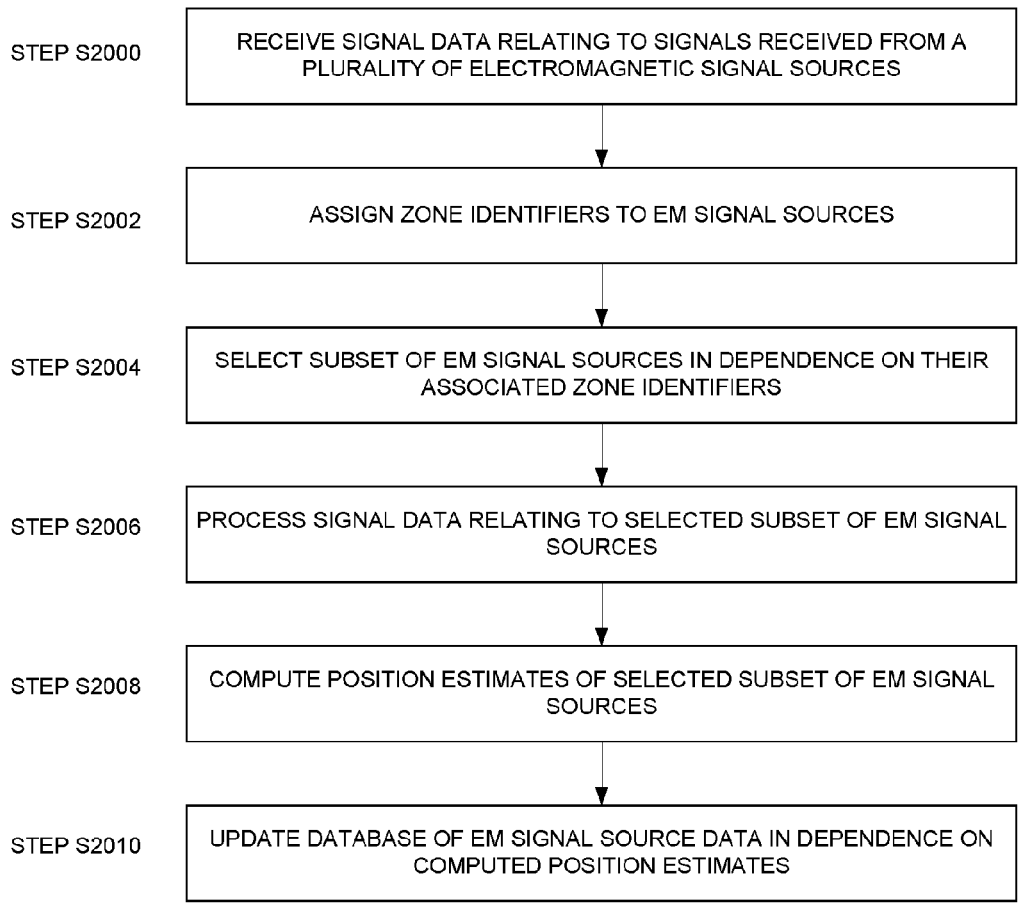
FIG. 20 is a flowchart illustrating a further process for improving a position estimate of a user device in the system of FIG. 1.

FIG. 20 is a flowchart illustrating a further process, namely that described in the present embodiment, for improving a position estimate of a user device in the system of FIG. 1. The flowchart summarises the basic process.

In step S2000, signal data is received (typically, though not necessarily, at the location server) relating to signals received (at a device, which may be the same entity that holds and processes the database) from a plurality of electromagnetic signal sources. Next (S2002) zone identifiers are assigned to electromagnetic (EM) signal sources that are included in the signal data (which may typically be an amalgam of data received from various devices associated with various users). A subset of the EM signal sources is selected corresponding (typically) to signal sources associated with particular zones, that is to say associated with particular zone identifiers. The zone identifiers may be persistent identifiers, for example stored in the database, or may be temporary handles of some sort to facilitate processing.

In step S2006, the selected subset of signal sources are processed, and then (S2008) position estimates are computed or recomputed for those signal sources. The database is then updated (S2010), by adding or amending entries as appropriate, in order to incorporate the new or revised position estimates.

It will be appreciated this general principle can apply for various different configurations (specifically, different distributions of processes and data between a user device and the location server).

Although the present invention has been described above with reference to specific embodiments, it will be apparent to a skilled person in the art that modifications lie within the spirit and scope of the present invention.

The invention claimed is:

1. A method of managing a database of positioning data, the positioning data including electromagnetic signal source data for use by a positioning system, and the method comprising:

receiving signal data relating to signals received by user devices from a plurality of electromagnetic signal sources;

associating each of the electromagnetic signal sources with an appropriate geographical region selected from a plurality of geographical regions;

selecting a subset of the plurality of electromagnetic signal sources in dependence on their associated geographical regions;

processing the signal data relating to the subset of the plurality of electromagnetic signal sources to compute position estimates of the electromagnetic signal sources; and updating the database of electromagnetic signal source data in dependence on the computed position estimates, wherein each electromagnetic signal source has a zone code assigned to it, a first zone code being associated with a subset of signal sources having substantially the highest level of accuracy of position estimation, a second zone code being associated with zones of signal sources whose position estimates depend on position estimates associated with a zone of the first zone code.

2. A method according to claim 1, wherein selecting a subset of signal sources comprises selecting signal sources associated with geographical regions that have a relatively poor coverage in the database.

3. A method according to claim 1, wherein the electromagnetic signal source data relating to the selected subset of signal sources is updated before the electromagnetic signal source data relating to the non-selected signal sources.

4. A method according to claim 1, further comprising processing the selected subset of signal sources substantially in realtime and/or on demand.

5. A method according to claim 1, further comprising processing the non-selected signal sources on a periodic basis, as a batch job and/or when a processing load falls below a threshold amount.

6. A method according to claim 1, further comprising assigning a priority to each of the signal sources, and processing the signal sources substantially in order of said priority.

7. A method according to claim 1, wherein updating the database comprises at least one of: updating a database entry and adding a database entry.

8. A method according to claim 1, wherein whilst the device is in continuous communication with an electromagnetic signal source of the subset of electromagnetic signal sources, the method comprises: estimating the position of the device using an estimate of the position of the said electromagnetic signal source from the database prior to the step of updating the database of electromagnetic signal source data; obtaining an updated estimate of the position of the said electromagnetic signal source; and estimating an updated position of the device using the updated estimate of the position of the said electromagnetic signal source.

9. A method according to claim 8 wherein the step of obtaining an updated estimate of the position of the electromagnetic signal source comprises obtaining an updated estimate of the position of the electromagnetic signal source from the database after the step of updating the database has been performed.

10. A method according to claim 8 further comprising outputting the position and the updated position to a user whilst the device is in continuous communication with the said electromagnetic signal source.

11. A method according to claim 1, wherein processing the signal data further comprises identifying connections between zones, and processing relevant portions of the electromagnetic signal source data to reestimate the position of relevant signal sources and optionally to recalculate zone codes of relevant zones.

12. A method according to claim 11, wherein re-estimating the position of relevant signal sources includes processing portions of said signal data relating to signals received from said relevant signal sources at a plurality of different locations.

13. A method according to claim 12, wherein said signal data, relating to signals received at a plurality of different locations, is a combination of a plurality of signal data transmissions received from a respective plurality of devices.

14. A method according to claim 12, further comprising modelling the plurality of different locations as points on a path in the vicinity of said relevant zones.

15. A method according to claim 12, wherein at least some adjacent zones of electromagnetic signal sources associated with different zone codes differ in terms of altitude.

16. A method according to claim 1, further comprising:
receiving local signal data relating to signals received at a user device from a plurality of electromagnetic signal sources local to the user device;
processing the local signal data in dependence on the electromagnetic signal source data to generate an estimate of the position of the user device; and
outputting the estimate of the position of the user device.

17. A method according to claim 1, wherein the database is a local database that is at least a partial copy of a master database.

18. A method according to claim 17, further comprising synchronizing the local database and the master database.

19. A method according to claim 18, wherein the position estimate of the user device is outputted before the local database is synchronized with the master database.

20. A device operable to use a positioning system that generates position estimates in dependence on signal data relating to signals received at the device from a plurality of electromagnetic signal sources, the device comprising:
a receiver for receiving at least one signal from a respective at least one electromagnetic signal source;
a processor; and
computer program code for causing the processor, in use, to carry out the method of claim 1.

21. A server operable to provide a positioning system for a device, the positioning system being operable to generate position estimates in dependence on signal data relating to signals received at the device from a plurality of electromagnetic signal sources, and the server comprising:
a database of positioning data including electromagnetic signal source data for use by the positioning system;
a network connection for receiving signal data relating to signals received from a plurality of electromagnetic signal sources, and for transmitting position estimates;
a processor; and
computer program code for causing the processor, in use, to carry out the method of claim 1.

22. A user positioning system comprising:
a device, including a receiver for receiving at least one signal from a respective at least one electromagnetic signal source; and
a server, including a database of positioning data including electromagnetic signal source data for use by the positioning system;
wherein the device and the server are configured to carry out, between them, the method of claim 1.

23. A non-transitory computer readable medium tangibly embodying computer program code for causing a computer to carry out a method as claimed in claim 1.

24. A method of managing a database of positioning data, the positioning data including electromagnetic signal source data for use by a positioning system, and the method comprising:
  receiving signal data relating to signals received from a plurality of electromagnetic signal sources;
  associating an appropriate one of a plurality of zone codes with each of the electromagnetic signal sources, each zone code being associated with a respective geographical zone, and wherein the zone codes comprise a first zone code associated with a subset of signal sources having substantially the highest level of accuracy of position estimation, and a second zone code associated with zones of signal sources whose position estimates depend on position estimates associated with electromagnetic signal source associated with the first zone code;
  processing the signal data to compute position estimates of the electromagnetic signal sources; and
  updating the database of electromagnetic signal source data in dependence on the computed position estimates.

25. A method according to claim 24 wherein whilst the device is in continuous communication with an electromagnetic signal source of the plurality of electromagnetic signal sources, the method comprises: estimating the position of the device using an estimate of the position of the said electromagnetic signal source from the database prior to the step of updating the database of electromagnetic signal source data; obtaining an updated estimate of the position of the said electromagnetic signal source; and estimating an updated position of the device using the updated estimate of the position of the said electromagnetic signal source.

26. A method according to claim 25 wherein the step of obtaining an updated estimate of the position of the electromagnetic signal source comprises obtaining an updated estimate of the position of the electromagnetic signal source from the database after the step of updating the database has been performed.

27. A method according to claim 25 further comprising outputting the position and the updated position to a user whilst the device is in continuous communication with the said electromagnetic signal source.

* * * * *